(12) United States Patent
Park et al.

(10) Patent No.: US 8,730,422 B2
(45) Date of Patent: May 20, 2014

(54) LIQUID CRYSTAL DISPLAY

(75) Inventors: Gyung-Soon Park, Seoul (KR); Il Gon Kim, Seoul (KR); Seon Young Choi, Gunpo-si (KR); Sung Hoon Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 57 days.

(21) Appl. No.: 13/614,669

(22) Filed: Sep. 13, 2012

(65) Prior Publication Data

US 2013/0314658 A1 Nov. 28, 2013

(30) Foreign Application Priority Data

May 23, 2012 (KR) .................. 10-2012-0054708

(51) Int. Cl.
*G02F 1/136* (2006.01)

(52) U.S. Cl.
USPC ............... 349/45; 349/42; 349/143; 349/144

(58) Field of Classification Search
USPC ..................... 349/42, 45, 143, 144
See application file for complete search history.

(56) References Cited

U.S. PATENT DOCUMENTS

| | | | |
|---|---|---|---|
| 6,914,641 B2 | 7/2005 | Choo et al. | |
| 2008/0266474 A1 | 10/2008 | Hazeyama | |
| 2009/0122247 A1 | 5/2009 | Chang | |
| 2011/0234936 A1 | 9/2011 | Yang et al. | |
| 2011/0273651 A1 | 11/2011 | Kim et al. | |

FOREIGN PATENT DOCUMENTS

| | | |
|---|---|---|
| JP | 06-051329 A | 2/1994 |
| JP | 06-214247 A | 8/1994 |
| JP | 2006-267317 A | 10/2006 |
| JP | 2007-183628 A | 7/2007 |
| KR | 1020070020868 A | 2/2007 |
| KR | 1020080062806 A | 7/2008 |
| KR | 1020100008691 A | 1/2010 |
| KR | 1020110002569 A | 1/2011 |
| KR | 1020110024596 A | 3/2011 |
| KR | 1020110066478 A | 6/2011 |
| KR | 1020110071036 A | 6/2011 |

*Primary Examiner* — Phu Vu
(74) *Attorney, Agent, or Firm* — Innovation Counsel LLP

(57) ABSTRACT

A liquid crystal display uses a layout which reduces the number of data lines relative to the number of pixel columns by providing one data line for every two pixel columns. The display is structured to prevent a passivation layer from becoming opaque due to a manufacturing haze effect by forming the pixel electrode below a gate insulating layer. It is structured to prevent a drain electrode from being damaged due to an etchant used for patterning the pixel electrode. Further, it is structured to prevent a short circuit between a common voltage line and a gate line while not substantially reducing an aperture ratio by disposing a common voltage contact hole for electrically connecting the common voltage line with a common electrode between vertically extending portions of two gate lines that generally extend horizontally.

40 Claims, 16 Drawing Sheets

LIQUID CRYSTAL DISPLAY

CROSS-REFERENCE TO RELATED APPLICATION

This application claims priority to and the benefit of Korean Patent Application No. 10-2012-0054708 filed in the Korean Intellectual Property Office on May 23, 2012, the entire contents of which application are incorporated herein by reference.

BACKGROUND (a) Field of Disclosure

The present disclosure of invention relates to a liquid crystal display.

(b) Description of Related Technology

Liquid crystal displays (LCD's) are one of the most common types of flat panel displays currently in use. An LCD is a display device in which liquid crystal molecules of a liquid crystal layer are rearranged by applying an electric field through the liquid crystal layer whereby the LC molecules are re-oriented and their optical properties are used to control a transmitted light amount. The electric field through the liquid crystal layer is typically formed by applying a voltage between a so-called, pixel-electrode and an opposed common electrode. In one type of LCD, the pixel-electrode and opposed common electrode are respectively disposed on spaced apart substrates. In a second type of LCD, the pixel-electrode and opposed common electrode are integrally disposed on a same substrate.

The liquid crystal types of display have advantages such as that of being easily made thin, but they also generally have a disadvantage in that side visibility of images produced by them are poor as compared with front (face on) visibility. As a result, various liquid crystal device layout arrangements and driving methods have been developed in order to try and solve the side visibility problem. One such method for providing a wide viewing angle for a liquid crystal display involves placing the pixel electrode and the common electrode on one same substrate.

However, during manufacturing of such devices having the pixel electrode and the common electrode on the same substrate, new problems develop. A first such problem is that optical transmittance may be reduced by a haze effect due to a chemical reduction reaction which may take place between two of the electrodes. Further, if the pixel electrode is formed to directly contact the drain electrode of a corresponding thin film transistor (TFT) or of another such switching element, the drain electrode may be damaged by an etchant used to pattern the pixel electrode. Further, in order to connect the common electrode with a common voltage line that is used for transferring a common electrode voltage thereto, a contact hole may need to be formed, and as a result, an aperture ratio of the liquid crystal display is deteriorated. Additionally, the common voltage transferring line and the gate line may become shorted to each other, for example due to static electricity generated while forming the drain contact hole.

Meanwhile, as sizes of liquid crystal displays generally increase (due to market desires), the number of the data lines provided on the one substrate tends to increase and the cost for a data driver used to drive those data lines also tends to increase, thereby increasing the overall manufacturing cost of the liquid crystal display.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

The present disclosure of invention is provided with an effort to provide a relatively wide viewing angle liquid crystal display having advantages of reducing the number of data lines relative to the number of pixel columns, of preventing optical transmittance from being reduced due to a haze effect imparted to a transparent electrode during manufacture, of preventing a drain electrode from being damaged during patterning of a pixel-electrode, and of transferring common voltage to fingers of a multi-pronged common electrode without substantially reducing an aperture ratio and while preventing a short circuit condition that may occur during manufacture.

An exemplary embodiment provides a liquid crystal display, including: a plurality of pixel electrodes disposed in a matrix arrangement including pixel columns and pixel rows; a first gate line and an immediately adjacent second gate line disposed between two of the pixel electrode rows and extending generally in a first direction parallel that of the pixel rows; a first data line and a second data line disposed at left and right sides of the combination of the two pixel electrode columns, the data lines extending in a second direction; a common voltage line disposed between the two pixel electrode and extending in the second direction; and a common electrode vertically overlapped with and spaced apart from the plurality of pixel electrodes so as to form electric fields therebetween, where the common voltage line and the common electrode are vertically overlapped with each other and have an insulating layer interposed therebetween and where the common voltage line and the common electrode are connected with each other through a common contact hole, the common contact hole being formed through the insulating layer and disposed between corresponding first and second vertically extending portions of the otherwise generally horizontally extending first and second gate lines.

Other aspects of the present disclosure will become apparent from the below detailed description.

DETAILED DESCRIPTION

Figure 1:
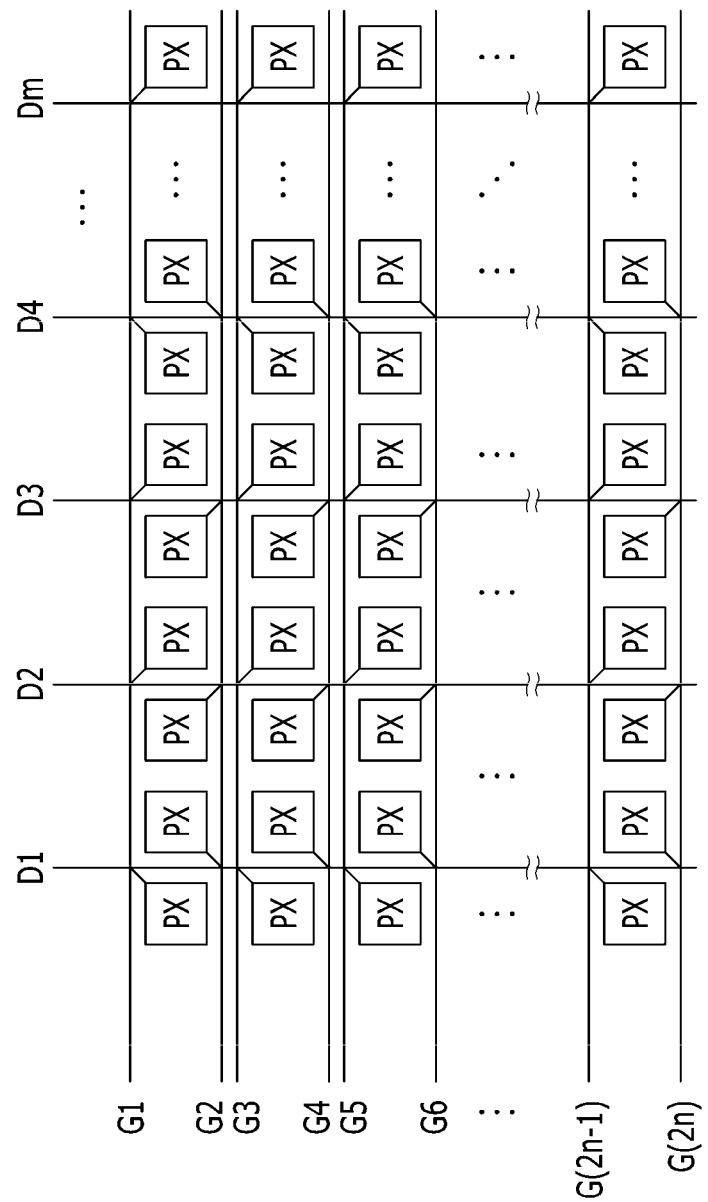
FIG. 1 is a schematic diagram illustrating a layout of signal lines (including paired gate lines) and of corresponding pixels (including indicating positionings of their switching elements) of a liquid crystal display according to an exemplary embodiment of the present disclosure.

The present disclosure of invention will be described more fully hereinafter with reference to the accompanying drawings, in which exemplary embodiments in accordance with the present teachings. As those skilled in the art would realize in light of this disclosure, the described embodiments may be modified in various different ways, all without departing from the spirit or scope of the present teachings.

In the drawings, the thickness of layers, films, panels, regions, etc., are generally exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Referring to FIG. 1, first, a schematic layout of signal lines (e.g., gate lines and data lines) and the corresponding pixels of a liquid crystal display according to an exemplary embodiment of the present disclosure will be described.

More specifically, in FIG. 1, the liquid crystal display according to the given exemplary embodiment includes a transistor array substrate that has integrally disposed thereon a plurality of display-driving signal lines, G1-G2$n$ and D1-Dm and a plurality of pixels PX connected thereto and arranged in a substantially matrix form.

The signal lines include a plurality of gate lines G1-G2$n$ configured for transferring gate signals (also referred to as digital "scanning signals") and a plurality of data signal lines or data lines D1-Dm configured to transferring analog data signals. The gate lines G1-G2$n$ extend in a substantially row direction and are substantially parallel to each other, and the data lines D1-Dm extend in a substantially column direction and are substantially parallel to each other.

each pair of gate lines $G_1$ and $G_2$, $G_3$ and $G_4$, ..., $G(2n-1)$ and $G(2n)$ is respectively disposed immediately below and immediately above each row of pixels PX such that the pixels PX of one pixel row are connected to one of the pair of gate lines G1 and G2, G3 and G4, ..., $G(2n-1)$ and $G(2n)$.

As for the data lines, there is one data line Di for a pair of pixel columns. A data line Di is one of the data lines D1-Dm. In more detail, a data line Di extends between a pair of pixel columns such that the pixels PX of the odd-numbered pixel columns are connected to the data lines that are to the right side of the pixel columns, and the pixels PX of the even-numbered pixel columns are connected to the data lines that are to the left side of the pixel columns.

When the data lines D1, D2, D3, . . . are disposed as described above, the number of data lines D1, D2, D3, . . . needed to drive the given number of pixel columns may be decreased in half relative to the given number of pixel columns, such that the cost of the data driver (e.g., integrated circuit chip (not shown) with corresponding number of output terminals) is reduced and thus the overall manufacturing cost of the liquid crystal display may be reduced.

Figure 2:
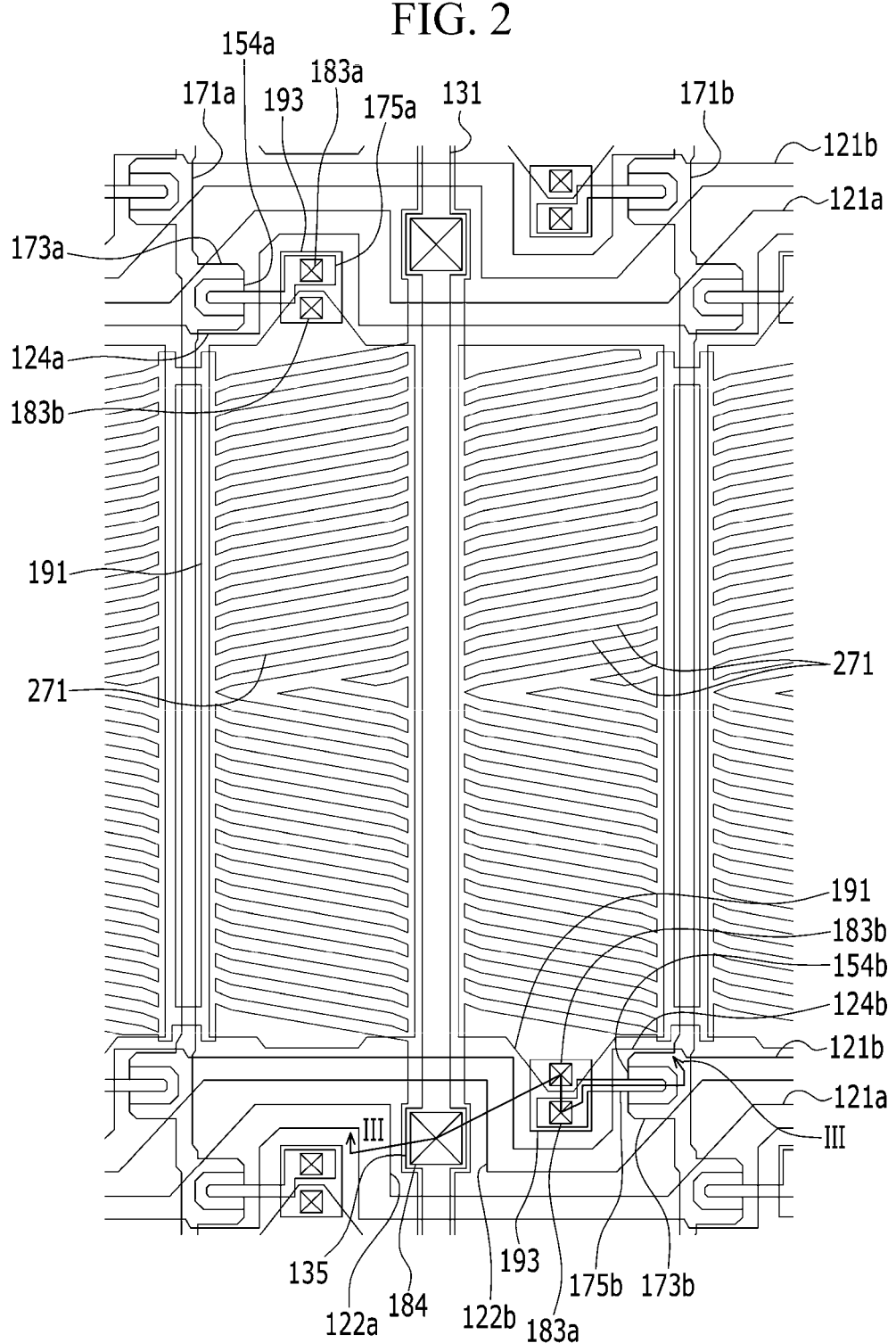
FIG. 2 is a more detailed layout view (roughly to scale) illustrating some pixels of a liquid crystal display according to the schematically illustrated embodiment of FIG. 1.
Figure 3:
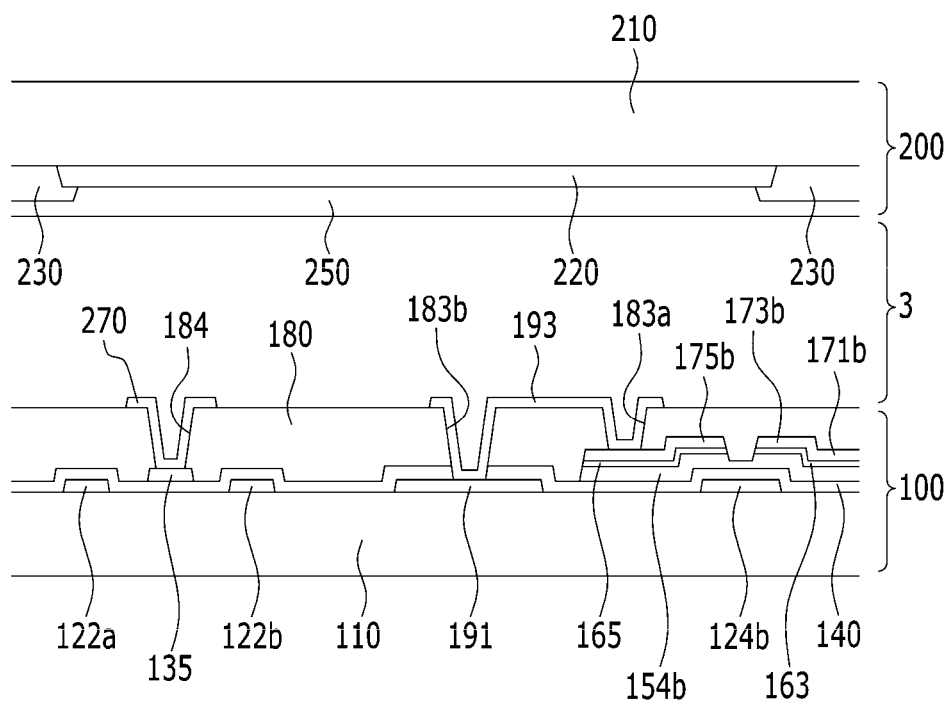
FIG. 3 is a cross-sectional view illustrating the liquid crystal display of FIG. 2 taken along line III-III.
Figure 4:
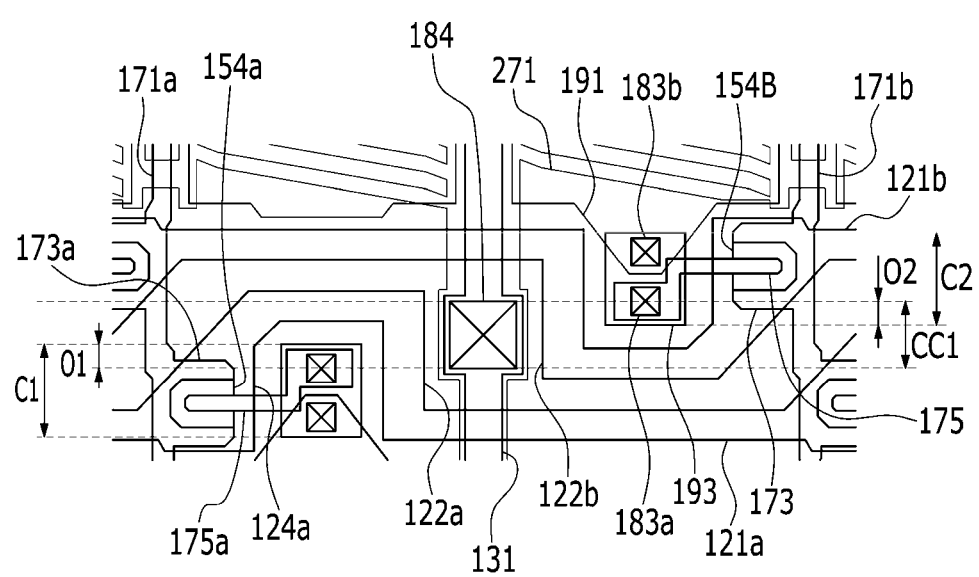
FIG. 4 is a diagram illustrating in more detail a part of the liquid crystal display of FIG. 2.

Next, further aspects of a liquid crystal display according to an exemplary embodiment will be described with reference to FIGS. 2 to 4. FIG. 2 is a layout view illustrating some pixels of the liquid crystal display according to a corresponding exemplary embodiment. FIG. 3 is a cross-sectional view illustrating the liquid crystal display of FIG. 2 taken along line III-III. FIG. 4 is a diagram illustrating a part of a liquid crystal display according to this exemplary embodiment.

Referring to FIG. 3, the liquid crystal display according to the exemplary embodiment includes a lower panel 100 and a spaced apart upper panel 200 facing each other, and a liquid crystal layer 3 injected (interposed) between the two display panels 100 and 200.

The lower panel 100 (a.k.a., the transistor array substrate) will now be described with additional reference to FIG. 2.

Pairs of immediately adjacent gate lines 121$a$ and 121$b$ and pairs of immediately adjacent pixel electrodes 191 (immediately adjacent here if no intervening data line 171) are integrally formed on an insulative base substrate 110 made of transparent glass, plastic, or the like.

As described above, the gate lines 121$a$ and 121$b$ are provided as pairs for respective ones of pixel rows. In other words, each row of pixels has a first gate line 121$a$ disposed at its upper side, and a second gate line 121$b$ disposed at its lower side. Additionally, except for the top most one (G1 of FIG. 1), each first gate line 121$a$ is disposed to be immediately adjacent to the second gate line 121$b$ of the row above. Each second gate line 121$b$ is disposed immediately adjacent to the first gate line 121$a$ of the next pixel row below. Accordingly, the first gate line 121$a$ and the second gate line 121$b$ which are positioned in the current pixel row make a pair with the second gate line 121$b$ and the first gate line 121$a$ which are disposed in the adjacent pixel row to be disposed between the pixel rows.

The first gate line 121$a$ includes a corresponding first gate electrode 124$a$ integrally branching therefrom, and the second gate line 121$b$ includes a corresponding second gate electrode 124$b$ integrally branching therefrom. Additionally, the first gate line 121$a$ includes a first vertical portion 122$a$, and the second gate line 121$b$ includes a second vertical portion 122$b$.

The pixel electrode 191 may have a planar shape which packs most of one pixel area. The overall shape (general boundary shape) of the pixel electrode 191 may be mostly a polygon (e.g., trapezoid) having first sides running substantially parallel to the gate lines 121$a$ and 121$b$, and second sides running substantially parallel to the data line 171$a$ or 171$b$, and also parallel to the common voltage transferring line 131. The pixel electrode 191 may be made of a transparent conductive material such as ITO or IZO and internally within its generally polygonal boundary, it may be formed like the many teeth of a fine-toothed comb. Fingers of an opposed common electrode 270 come to be interdigitated between the many teeth of the fine-toothed comb shape of the pixel-electrode.

The gate lines 121$a$ and 121$b$ and the pixel electrode 191 may be formed with the same layer and of a same conductive material. Further, the gate lines 121a and 121b and the pixel electrode 191 may also be formed through use of a same photolithography process using one shared photomask for patterning them. In one embodiment, each of the gate lines 121a and 121b may have a dual-layered conductive structure including an upper (non-transparent) conductive layer formed on the transparent conductive layer (e.g., ITO, IZO) of the pixel electrode 191.

A gate insulating layer 140 is formed on the gate lines 121a and 121b and on the pixel electrode 191. The gate insulating layer 140 may be made of an inorganic insulator such as a silicon nitride (SiNx) or a silicon oxide (SiOx).

A plurality of semiconductive islands 154a and 154b respectively including a first semiconductor 154a and a second semiconductor 154b are formed on the gate insulating layer 140. The semiconductors 154a and 154b may be semiconductive oxides. The first semiconductor 154a and the second semiconductor 154b may also be connected with each other.

A plurality of ohmic contacts 163 and 165 is disposed on the semiconductors 154a and 154b. The ohmic contacts 163 and 165 face each other based on the respective gate electrodes 124a and 124b and make a pair to be disposed on the semiconductors 154a and 154b. The ohmic contacts 163 and 165 may be made of a material such as n+ hydrogenated amorphous silicon which is doped with an n-type impurity such as phosphorus at high concentration, or of a silicide. However, in the case where the semiconductors 154a and 154b are semiconductive oxides, the ohmic contacts 161, 163, and 165 may be omitted. In the case where the semiconductors 154a and 154b are semiconductive oxides, a barrier layer and a capping layer may also be formed at the upper and lower portions of the semiconductors 154a and 154b.

A data signals and common voltage conductor subsystem including a plurality of data lines 171a and 171b, a plurality of drain electrodes 175a and 175b, and a plurality of common voltage transferring lines 131 is formed above the ohmic contacts 163 and 165.

The data lines 171a and 171b transfer data signals and mainly extend in a vertical direction to cross the gate lines 121a and 121b. The data lines 171a and 171b include a first data line 171a and a second data line 171b which are disposed with two immediately adjacent pixel electrodes 191 disposed therebetween.

Each of the data lines 171a and 171b is disposed one by one for every two pixel columns, and each of the data lines 171a and 171b is alternately connected with the pixel electrodes 191 of the pixels which are disposed at the lefts and rights of the respective data line. As described above, each of the data lines 171a and 171b is connected to two pixel columns to apply data voltages to the pixels of those two columns, such that the number of data lines 171a and 171b may be decreased in half relative to the number of pixel columns. Accordingly, the cost of the liquid crystal display may be reduced.

The first data line 171a includes a first source electrode 173a extending toward the first gate electrode 124a, and the second data line 171b includes a second source electrode 173b extending toward the second gate electrode 124b.

The first drain electrode 175a includes an end portion spaced apart from and facing the first source electrode 173a and the other end portion having a wide area based over the first gate electrode 124a.

The second drain electrode 175b includes an end portion facing the second source electrode 173b and the other end portion having a wide area based on the second gate electrode 124b.

In the case of the liquid crystal display according to the exemplary embodiment described here, since the pixel electrode 191 is formed and covered by the gate insulating layer 140 and then the data conductor is later formed above it, it is possible to prevent the data conductor from being damaged by an etchant used for patterning the material (e.g., ITO, IZO) of the pixel electrode 191. Otherwise, if it were the other way around, the hypothetically first formed data conductor may be damaged when the pixel electrode 191 is formed directly on the data conductor.

The common voltage line 131 is disposed between the two data lines 171a and 171b to extend to be parallel with the data lines 171a and 171b. The common voltage line 131 includes a plurality of extensions 135 making direct contact with corresponding fingers of the common electrode 270.

The extensions 135 of the common voltage line 131 are disposed between the vertical portions 122a and 122b of the first gate line 121a and the second gate line 121b.

As described above, since the extensions 135 of the common voltage line 131 are disposed between the vertical portions 122a and 122b of the first gate line 121a and the second gate line 121b, an area formed by the gate lines 121a and 121b and the extensions 135 of the common voltage line 131 may be reduced. This aspect will be described below in more detail.

The common voltage line 131 is disposed between the two pixel electrodes 191 of two pixel areas which are otherwise disposed to be immediately adjacent to each other in a pixel row direction (with no data line in between). The common voltage line 131 may be composed of an opaque material, thereby preventing light leakage in a region between the two pixel electrodes 191.

The first/second gate electrodes 124a/124b, the first/second source electrodes 173a/173b, and the first/second drain electrodes 175a/175b form a thin film transistor (TFT) which is a switching element together with the first/second semiconductors 154a/154b, respectively. The semiconductors 154a/154b may have substantially the same planar form as the data lines 171a and 171b, the drain electrodes 175a and 175b, and the ohmic contacts 163 and 165 therebelow, except for channel region of the thin film transistor.

A first passivation layer 180 is disposed on the data and common voltage conductor subsystem 171a, 171b, 175a, 175b and 131 and the exposed semiconductors 154a and 154b. The first passivation layer 180 may be made of an inorganic insulating material or an organic insulating material.

In the case where the first passivation layer 180 is made of the organic material, the first passivation layer 180 may be a color filter 230, and in this case, the color filter 230 shown in FIG. 3 to be disposed on the upper panel 200 is omitted.

In the case where the first passivation layer 180 is the color filter 230, a second passivation layer (not shown) disposed below the first passivation layer 180 and a third passivation layer (not shown) disposed on the first passivation layer 180 may be further included. In this case, the second passivation layer may prevent components of the color filter 230 from being diffused to the thin film transistor. The second passivation layer may be formed as an inorganic insulating layer for example. The third passivation layer may have a dual-layer structure of a lower layer formed as an inorganic insulating layer and an upper layer formed as an organic insulating layer. In this case, the lower layer of the third passivation layer may prevent the component of the color filter from being exposed outside, may be formed during manufacture at a lower temperature than the gate insulating layer 140 to thus prevent deformation or discoloration of the color filter 230 disposed therebelow, and may reduce transmittance loss due to a difference in a refractive index between the color filter and the organic insulating layer disposed therebelow. The upper layer of the third passivation layer may be used to reduce a step formation created due to overlapping of the color filters disposed in the adjacent pixels. This enhancement of planarity can assist in later uniformly rubbing an alignment layer thereon, and may lower capacitance between the data lines 171a and 171b and the common electrode 270 to reduce a signal delay of the data lines 171a and 171b. However, the lower layer of the third passivation layer may be an organic insulating layer, and the upper layer of the third passivation layer may be an inorganic insulating layer.

Further, in the case where the first passivation layer 180 is the color filter (which otherwise is 230 in FIG. 3), a light blocking member 220 disposed on the upper panel 200 may also be disposed on the lower panel 100, and in this case, the light blocking member 220 disposed on the upper panel 200 is omitted.

The first passivation layer 180 may be a dual-layer structure formed of an inorganic insulating layer and an organic insulating layer. In this case, the organic insulating layer may be of a low-K material which functions to lower capacitance between the data lines 171a and 171b and the common electrode 270 to reduce a signal delay of the data lines 171a and 171b.

In the case of the liquid crystal display according to the exemplary embodiment discussed here, since the first passivation layer 180 is formed above the pixel electrode 191 covered by the gate insulating layer 140, the pixel-electrode is protected by the gate insulating layer 140 and it is therefore possible to prevent an optical transmittance attribute of the pixel-electrode material (e.g., ITO, IZO) from being deteriorated due to a haze effect which may otherwise occur for a pixel electrode 191 made of ITO or the like when forming the first passivation layer 180 directly on it.

A first contact hole 183a is provided for exposing a part of the drain electrodes 175a and 175b is formed through the first passivation layer 180, and a second contact hole 183b exposing a part of the pixel electrode 191 is formed through the first passivation layer 180 and through the gate insulating layer 140. A third contact hole 184 exposing the extension 135 of the common voltage line 131 is formed through the first passivation layer 180.

According to a liquid crystal display according to another exemplary embodiment, the first contact hole 183a and the second contact hole 183b may also be formed as one contact hole. That is, one contact hole exposing the part of the drain electrodes 175a and 175b and the part of the pixel electrode 191 together may also be formed.

In the liquid crystal display according to the exemplary embodiment, the third contact hole 184 exposing the common voltage line 131 is not overlapped with the gate lines 121a and 121b. The extension 135 of the common voltage line 131 where the third contact hole 184 is provided, is not overlapped with the gate lines 121a and 121b.

As described above, the third contact hole 184 exposing the common voltage line 131 is formed to be separated from the gate lines 121a and 121b and thus it is possible to prevent the gate lines 121a and 121b and the common voltage line 131 from being shorted to each other if and when static electricity is generated during the process of forming the third contact hole 184 where such static might penetrates into the thin gate insulating layer 140.

Further, the extension 135 of the common voltage line 131 is formed not to be directly overlapped with the gate lines 121a and 121b and thus a non-planar step will not be formed at the position of the extension 135 of the common voltage line 131, such that the third contact hole 184 may be symmetrically formed without a height difference being attributed thereto at that position due to vertical portions 122a and 122b of the gate lines 121a and 121b passing through and nearby. Accordingly, it is possible to increase reliability of a physical and electrical connection between the common voltage line 131 and the common electrode 270 through the provision of the third contact hole 184.

The common electrode 270 and a pixel-electrode connecting member (bridge) 193 are formed on top of the first passivation layer 180. The common electrode 270 and the connecting member 193 may be made of a transparent material such as ITO or IZO.

The common electrode 270 includes a plurality of branch electrodes 271 integrally extending therefrom and is connected with the common electrode 270 disposed at the adjacent pixel.

The common electrode 270 (and thereby, its integral fingers 271 such as ones shown in FIG. 2) is physically and electrically connected with the common voltage line 131 through the third contact hole 184 formed in the first passivation layer 180 and receives common voltage therefrom.

The connecting member (pixel-electrode bridge) 193 covers the first contact hole 183a where the latter is exposing a part of the drain electrodes 175a and 175b and the where the second contact hole 183b is exposing a part of the pixel electrode 191 to thereby physically and electrically connect the drain electrodes 175a and 175b together with the respective pixel electrodes 191.

The respective pixel electrodes 191 (both have same reference number in drawings but could be respectively called 191a and 191b) are respectively electrically connected with the respective drain electrodes 175a and 175b through their respective connecting members 193 to receive corresponding data voltages from their corresponding TFT's.

The pixel electrodes 191 which receive their respective data voltages, generate corresponding electric fields through the liquid crystal layer 3 and to the spaced apart but neighboring portions of the common electrode 270 where those neighboring portions (including branch electrodes 271) are receiving the common voltage.

The plurality of branch electrodes 271 of the common electrode 270 are spaced apart and laterally interdigitated with corresponding comb teeth of the pixel electrode 191, where the latter has a planar form in its layer of formation directly above the base substrate 110.

A first alignment layer (not shown) is coated on the inner surface of the lower panel 100.

Next, the upper panel 200 will be described.

The light blocking member 220 is formed on an insulative upper base substrate 210 made of transparent glass, plastic, or the like. The light blocking member 220 is called a black matrix and functions to block leakage of uncontrolled light such as that which may escape through areas not controlled by respective pixel-electrodes.

A plurality of differently colored color filters 230 are formed (in one embodiment) on the upper base substrate 210. Most of the color filters 230 exist in a region surrounded by the light blocking member 220, and may be elongated in a vertical direction along a pixel electrode 191 column. Each color filter 230 may display one of primary colors such as three primary colors of red, green and blue. Examples of the primary colors may include three primary colors of red, green and blue or yellow, cyan, magenta and the like. Although not shown, the color filters may further include a color filter displaying a mixed color of the primary colors or a white color or clear in addition to the primary colors.

An planarizing overcoat 250 is formed on the color filter 230 and the light blocking member 220. The overcoat 250 may be made of an (organic) insulator and prevents the color filter 230 from being exposed and provides a flat surface. The overcoat 250 may be omitted.

A second alignment layer (not shown) is coated on the inner surface (inner relative to where the liquid crystal material is stored) of the upper panel 200.

The liquid crystal layer 3 interposed between the lower panel 100 and the upper panel 200 includes liquid crystal molecules (not shown), and the liquid crystal molecules may be aligned by the alignment layers (not shown) so that a long axis thereof is horizontal to the surfaces of the two display panels 100 and 200 in a state where the electric field is not applied.

The liquid crystal layer 3 may have positive dielectric anisotropy or it may have negative dielectric anisotropy. The liquid crystal molecules of the liquid crystal layer 3 may be aligned so as to have a pretilt in a predetermined direction, and the pretilt direction of the liquid crystal molecules may be changed according to the dielectric anisotropy of the liquid crystal layer 3.

A backlight unit (not shown) which generates light and supplies the light to the two panels 100 and 200 may be further included outside the substrate 110 of the lower panel 100. The provided backlighting may be a white light and/or selectively turned on, colored lights.

Each pixel electrode 191 which is supplied with a respective data voltage from its corresponding TFT functions to generate a respective electric field through the local portion of the liquid crystal layer 3 together with the neighboring portion of the common electrode 131 receiving the common voltage, thereby determining a direction of the liquid crystal molecules of the liquid crystal layer 3 and displaying a corresponding image portion.

Next, relative positions of the gate lines 121a and 121b, the common voltage line 131, and the contact holes 183a, 183b, and 184 according to the exemplary embodiment will be described with reference to FIG. 4.

As shown in FIG. 4, the common voltage line 131 has an extension 135 disposed between the respective vertical portions 122a and 122b of the first gate line 121a and the second gate line 121b respectively, where the gate lines are otherwise disposed to extend adjacent and parallel to each other. The third contact hole 184 is formed on the extension 135, and the common voltage line 131 and the common electrode 270 are physically and electrically connected with each other through the third contact hole 184.

As shown in the drawing, the extension 135 of the common voltage line 131, in the location where the third contact hole 184 exposing the common voltage line 131 is disposed, is not laterally overlapped with the gate line portions 121a and 121b. As described above, the third contact hole 184 exposing the common voltage line 131 is formed to be separated from the gate lines 121a and 121b and thus it is possible to prevent the gate lines 121a and 121b and the common voltage line 131 from being shorted together due to static electricity which may be generated during the process of forming the third contact hole 184 to penetrate through the gate insulating layer 140.

Further, the extension 135 of the common voltage line 131 is formed not to be overlapped with the gate lines 121a and 121b and thus a nonplanar step may not be formed at the extension 135 of the common voltage line 131, such that the third contact hole 184 may be symmetrically formed without a height difference according to a position. Accordingly, it is possible to increase reliability of a physical and electrical connection between the common voltage line 131 and the common electrode 270 through the third contact hole 184.

As shown in FIG. 4, the first gate line 121a and the second gate line 121b have the respective first vertical portion 122a and the second vertical portion 122b, and the extension 135 of the common voltage line 131 is disposed between and not laterally overlapped by the vertical portions 122a and 122b of the first gate line 121a and the second gate line 121b which are disposed to be adjacent to each other.

A first contact portion (or region) C1 providing connection of the first drain electrode 175a and the pixel electrode 191 is disposed between the first vertical portion 122a of the first gate line 121a and the first gate electrode 124a. A second contact portion (or region) C2 providing connection of the second drain electrode 175b and the pixel electrode is disposed between the second vertical portion 122b of the second gate line 121b and the second gate electrode 124b. Further, as described above, a third contact portion (or region) CC1 providing connection of the common voltage line 131 and the common electrode 270 is disposed laterally between the first vertical portion 122a of the first gate line 121a and the second vertical portion 122b of the second gate line 121b.

The third contact portion CC1 of the common voltage line 131 and the common electrode 270 includes a first vertically overlapped portion O1 which is partially overlapped with the first contact portion C1. The third contact portion CC1 also includes a second vertically overlapped portion O2 which is partially overlapped with the second contact portion C2.

Further, the first contact portion C1 and the second contact portion C2 are vertically disposed at a position where the contact holes are inversely symmetrical to each other (diagonally mirror imaged to one another) relative to the third contact portion CC1.

As described above, the third contact portion CC1 is disposed between the vertical portions 122a and 122b of the two gate lines 121a and 121b. In addition, the respective first contact portion C1 and the second contact portion C2 of the two pixel electrodes 191 and the two drain electrodes 175a and 175b, which are disposed at the left and the right with the common voltage line 131 therebetween, and the third contact portion CC1 of the common voltage line 131 and the common electrode 270 are formed to have overlapped regions on the horizontal line. Therefore it is possible to reduce a vertical width dimension of the region where the two gate lines 121a and 121b and the contact hole 184 for connecting the common voltage line 131 and the common electrode 270 are formed. Accordingly, although the two gate lines 121a and 121b and the third contact portion CC1 of the common voltage line 131 and the common electrode 270 are disposed so as not to be laterally overlapped with each other, it is possible to prevent an aperture ratio of the liquid crystal display from being substantially deteriorated by this arrangement.

If it had been otherwise, and the third contact hole 184 had been interposed vertically between the horizontally extending parts where the two gate lines 121a and 121b while imposing the rule that that the two gate lines 121a and 121b and the third contact hole 184 are not laterally overlapped with each other, an interval between the two gate lines 121a and 121b (which extend only horizontally in this hypothetical) would need to be wider than the vertical width of the third contact hole 184 in order to accommodate placement of the third contact hole 184 there. In such a hypothetical case, the vertical width of the region where the two gate lines 121a and 121b and the contact hole 184 for connecting the common voltage line 131 and the common electrode 270 are formed would need to be increased, and as such, the aperture ratio of the liquid crystal display would be disadvantageously decreased.

As described above, the contact hole 184 for connecting the common voltage line 131 and the common electrode 270 is formed to be laterally interposed between the vertically extending portions 122a and 122b of the gate lines 121a and 121b, and the contact regions of the two pixel electrodes 191 which are disposed in this same region and at both sides of the common voltage line 131 so that the two drain electrodes 175a and 175b used for applying respective data voltages to the respective two pixel electrodes 191 (partially shown in FIG. 4) are formed to be inversely symmetrical (diagonally mirror imaged) to each other relative to the where the contact hole 184 is formed, such that it is possible to reduce the vertical width dimension where the two gate lines 121a and 121b pass through and where the contact hole 184 for connecting the common voltage line 131 and the common electrode 270 is formed.

In the liquid crystal display according to the exemplary embodiment of the present disclosure, the two gate lines 121a and 121b and the third contact portion CC1 of the common voltage line 131 and the common electrode 270 are disposed so as not to be vertically overlapped (in a plan view) with each other, such that it is possible to prevent the aperture ratio of the liquid crystal display from being deteriorated while keeping the contact hole 184 and the passing thereby portion of the gate lines 121a and 121b separated laterally from one another and thus preventing the common voltage line 131 and the gate lines 121a and 121b from being shorted to each other due to generation of static electricity during manufacture. However, in a liquid crystal display according to another exemplary embodiment in accordance with the present teachings, the contact hole 184 for connecting the common voltage line 131 and the common electrode 270 may be partially overlapped with a part of the gate lines 121a and 121b, such that the interval between the two gate lines 121a and 121b may become yet smaller.

Figure 5:
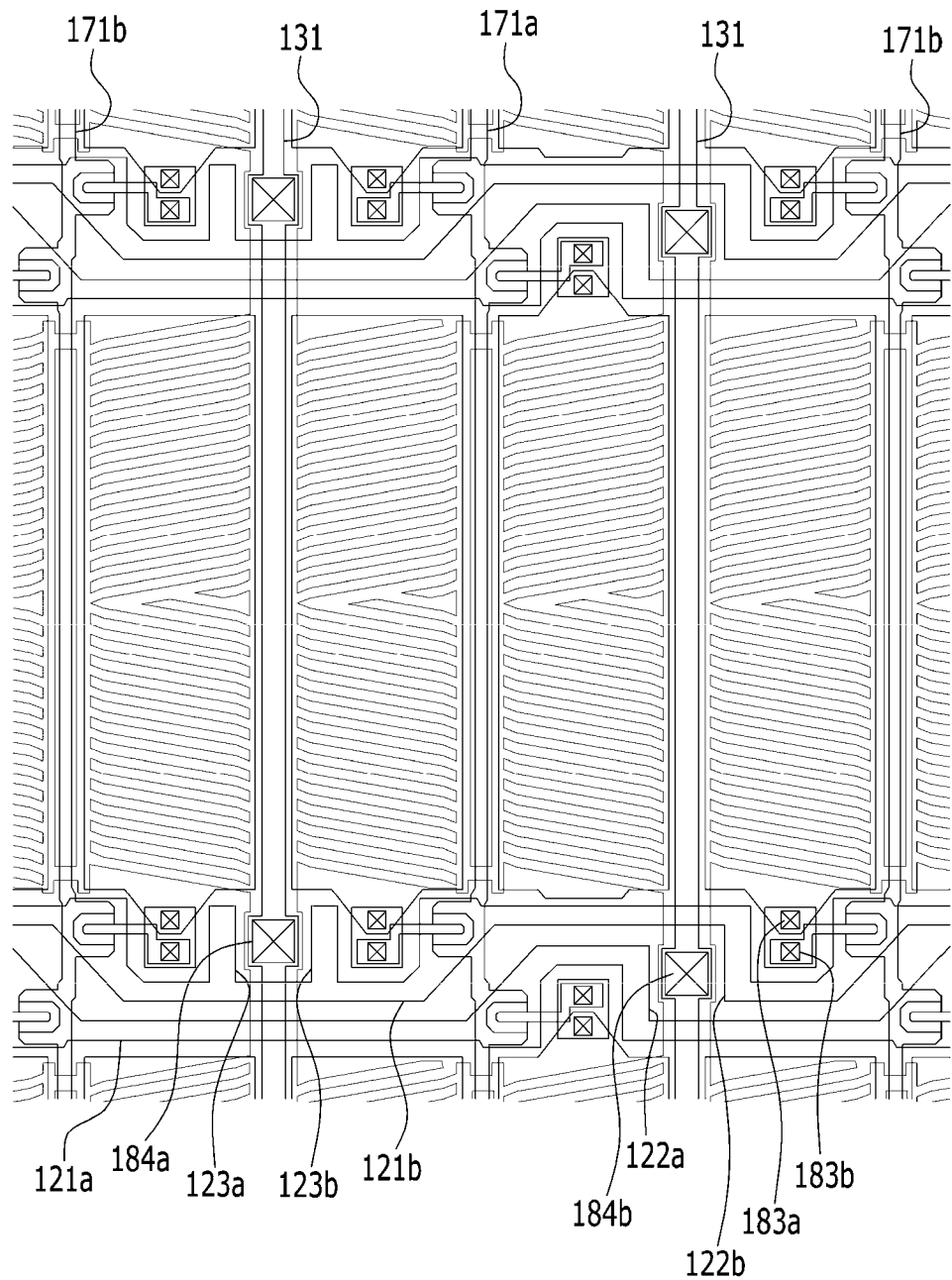
FIG. 5 is a layout view illustrating a plurality of pixels of a liquid crystal display according to another exemplary embodiment.
Figure 6:
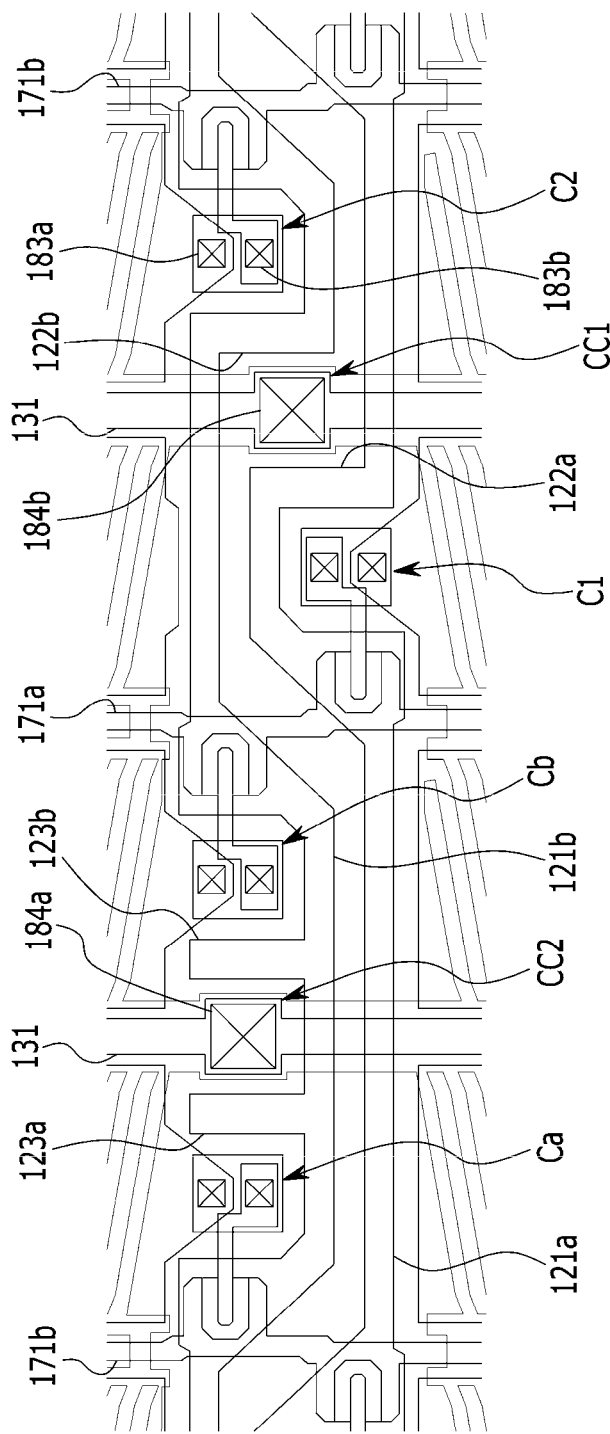
FIG. 6 is a diagram illustrating a part of a liquid crystal display according to another exemplary embodiment.

Next, a liquid crystal display according to another exemplary embodiment will be described with reference to FIGS. 5 and 6. FIG. 5 is a layout view illustrating some pixels of a liquid crystal display according to this next exemplary embodiment and FIG. 6 is a diagram illustrating in more detail a part of a liquid crystal display according to this next exemplary embodiment.

Referring to FIG. 5, the liquid crystal display according to the exemplary embodiment is almost similar to the liquid crystal display described with reference to FIGS. 2 to 4. In particular, the layer forming structure of the respective constituent elements is the same as that in the exemplary embodiment described with reference to FIGS. 2 to 4. Accordingly, the detailed description for like constituent elements is omitted.

Referring to FIG. 5, the liquid crystal display according to the exemplary embodiment includes two data lines 171a and 171b which are alternately disposed along two pixel electrode 191 columns. Unlike the liquid crystal display according to the exemplary embodiment described with reference to FIGS. 2 to 4, a second data line 171b which is disposed at the left of a first data line 171a is further disposed.

More specifically, two pixel electrodes 191 are shown disposed between the second data line 171b and the first data line 171a which are disposed at the left based on the first data line 171a are connected to two data lines 171a and 171b through a thin film transistor disposed below the pixel electrode 191, respectively. Meanwhile, two pixel electrodes 191 disposed between the second data line 171b and the first data line 171a which are disposed at the right based on the first data line 171a are connected to two data lines 171a and 171b through thin film transistors disposed above and below the pixel electrode 191, respectively.

Layouts of the two pixel electrodes 191 disposed between the second data line 171b and the first data line 171a which are disposed at the right based on the first data line 171a and the signal lines are the same as the exemplary embodiment described with reference to FIGS. 2 to 4.

All features of the liquid crystal display according to the exemplary embodiment described with reference to FIGS. 2 to 4 may be applied to the liquid crystal display according to the exemplary embodiment.

Next, layouts of the two pixel electrodes 191 disposed between the second data line 171b and the first data line 171a which are disposed at the right based on the first data line 171a and the signal lines will be described with reference to FIG. 6.

Referring to FIG. 6, the second gate line 121b of the two gate lines 121a and 121b, includes two third vertical portions 123a and 123b provided for every other one of common voltage lines 131.

The extension 135 of the common voltage line 131 and a fourth contact hole 184a exposing the extension 135 of the common voltage line 131 are disposed between the two third vertical portions 123a and 123b. The extension 135 of the common voltage line 131 and the fourth contact hole 184a exposing the extension 135 of the common voltage line 131 are disposed between two third vertical portions 123a and 123b, and are not overlapped with the two gate lines 121a and 121b.

Further, two second gate electrodes (124b) of the second gate line 121b are disposed to have mirror symmetry with the common voltage line 131 therebetween, and a fourth contact portion Ca and a fifth contact portion Cb between the pixel electrode 191 and the drain electrodes 175a and 175b are disposed to have mirror symmetry between the third vertical portions 123a and 123b of the second gate line 121b and the second gate electrode 124b. Further, a sixth contact portion CC2 between the common voltage line 131 and the common electrode 270 is disposed substantially on a straight line (but not entirely, there is slight vertical stagger) with the fourth contact portion Ca and the fifth contact portion Cb between the pixel electrode 191 and the drain electrodes 175a and 175b.

As described above, in the case of the liquid crystal display according to the exemplary embodiment of FIGS. 5-6, the gate line 121b connected to the two pixel electrodes 191 which are disposed with the common voltage line 131 therebetween has the two vertical portions 123a and 123b, and the sixth contact portion CC2 connecting the common voltage line 131 and the common electrode 270 is disposed between the two vertical portions 123a and 123b. Further, the fourth contact portion Ca and the fifth contact portion Cb where the two pixel electrodes 191 and the two drain electrodes 175a and 175b disposed with the common voltage line 131 therebetween are connected with each other are disposed at both sides with the sixth contact portion CC2 connecting the common voltage line 131 and the common electrode 270 therebetween to be disposed to have mirror symmetry relative to the common voltage line 131. Further, the sixth contact portion CC2 between the common voltage line 131 and the common electrode 270 is disposed substantially (but not exactly) on a straight line with the fourth contact portion Ca and the fifth contact portion Cb between the pixel electrode 191 and the drain electrodes 175a and 175b. Accordingly, a vertical width in which the two gate lines 121a and 121b and the contact hole 184a for connecting the common voltage line 131 and the common electrode 270 are formed may be reduced. The slight vertical staggering between the illustrated structures allows the horizontal packing of the contact structures to be enhanced.

If it had been otherwise and the sixth contact hole 184a had been formed between horizontally extending portions of the two gate lines 121a and 121b, then in order for the two gate lines 121a and 121b and the sixth contact hole 184a to not be vertically overlapped with each other, an interval between the two gate lines 121a and 121b needs to be wider than the vertical width of the sixth contact hole 184a. In this hypothetical case, the vertical width of the region where the two gate lines 121a and 121b and the contact hole 184a for connecting the common voltage line 131 and the common electrode 270 are formed is increased, such that the aperture ratio of the liquid crystal display is deteriorated.

In the liquid crystal display according to the exemplary embodiment of the FIGS. 5-6, the two gate lines 121a and 121b and the contact portion CC2 where the common voltage line 131 and the common electrode 270 contact each other are disposed so as not to be vertically overlapped with each other, such that it is possible to prevent the aperture ratio of the liquid crystal display from being deteriorated while preventing the common voltage line 131 and the gate lines 121a and 121b from being shorted due to static electricity.

Figure 7:
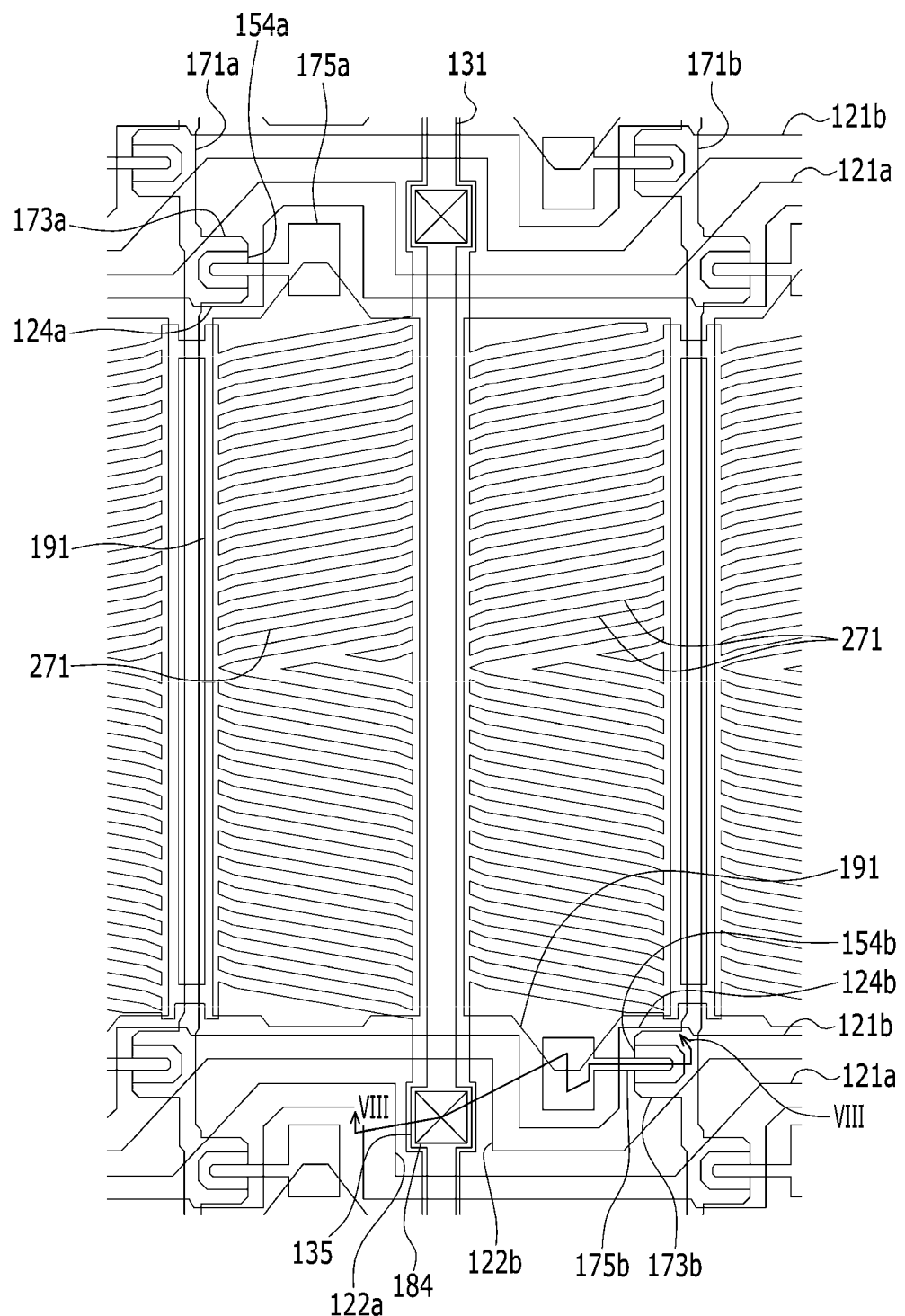
FIG. 7 is a layout view illustrating some pixels of a liquid crystal display according to yet another exemplary embodiment.
Figure 8:
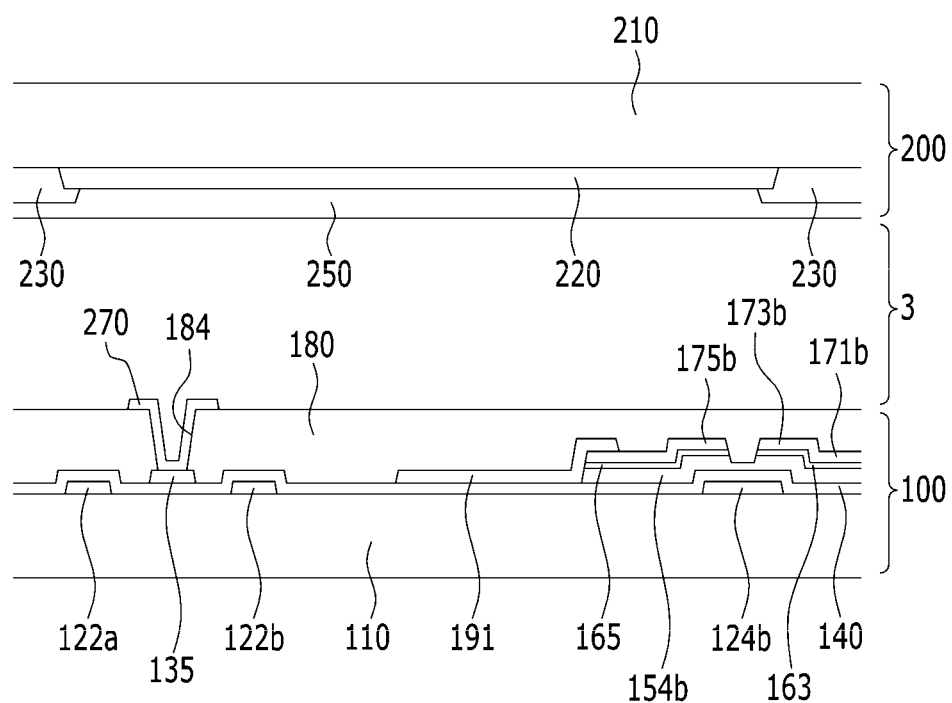
FIG. 8 is a cross-sectional view illustrating the liquid crystal display of FIG. 7 taken along line VIII-VIII.
Figure 9:
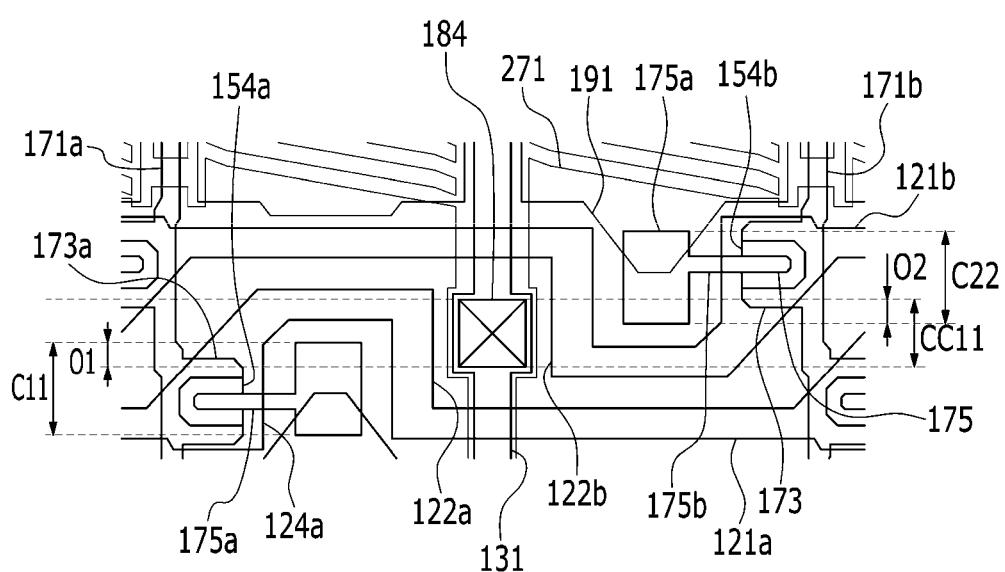
FIG. 9 is a diagram illustrating a part of a liquid crystal display according to another exemplary embodiment.

Next, a liquid crystal display according to another exemplary embodiment will be described with reference to FIGS. 7 to 9. FIG. 7 is a layout view illustrating some pixels of the liquid crystal display according to this next exemplary embodiment. FIG. 8 is a cross-sectional view illustrating the liquid crystal display of FIG. 7 taken along line VIII-VIII. FIG. 9 is a diagram illustrating a part of a liquid crystal display according to this next exemplary embodiment.

Referring to FIGS. 7 and 8, the liquid crystal display according to the exemplary embodiment is similar to the liquid crystal display according to the exemplary embodiment shown in FIGS. 2 and 3.

The liquid crystal display according to the exemplary embodiment of FIGS. 7-9 includes a lower panel 100 and an upper panel 200 facing each other, and a liquid crystal layer 3 injected between the two display panels 100 and 200.

The lower panel 100 will be described first.

A plurality of gate lines 121a and 121b is formed on an insulation substrate 110. The gate lines 121a and 121b are disposed for every one pixel row, and include a first gate line 121a disposed at the upper side along the pixel row and a second gate line 121b disposed at the lower side along the pixel row. The first gate line 121a is disposed to be adjacent to the second gate line 121b which is disposed in the adjacent front pixel row, and the second gate line 121b is disposed to be adjacent to the first gate line 121a which is disposed in the adjacent rear pixel row. Accordingly, the first gate line 121a and the second gate line 121b which are positioned in the current pixel row make a pair with the second gate line 121b and the first gate line 121a which are disposed in the adjacent pixel row to be disposed between the pixel rows.

The first gate line 121a includes a first gate electrode 124a, and the second gate line 121b includes a second gate electrode 124b. The first gate line 121a includes a first vertically extending portion 122a, and the second gate line 121b includes a second vertically extending portion 122b.

A gate insulating layer 140 is formed on the gate lines 121a and 121b.

A first semiconductive island 154a and a second semiconductive island 154b are formed on the gate insulating layer 140. A plurality of respective ohmic contacts 163 and 165 is disposed on the semiconductors 154a and 154b.

A data conducting subsystem is provided, including a plurality of data lines 171a and 171b, a plurality of drain electrodes 175a and 175b, and a plurality of common voltage lines 131, formed on the ohmic contacts 163 and 165.

The data lines 171a and 171b transfer respective data signals and mainly extend in a vertical direction to cross the gate lines 121a and 121b. The data lines include a first data line 171a and a second data line 171b which are disposed with two pixel electrodes 191 therebetween.

Each of the data lines 171a and 171b is disposed one by one for every two pixel columns, and each of the data lines 171a and 171b is alternately connected with the pixel electrodes 191 of the pixels which are disposed at the left and right sides of the data lines 171a and 171b along the pixel column. As described above, each of the data lines 171a and 171b is connected to a respective two pixel electrodes 191 in each row where the pixel-electrodes 191 are disposed in two pixel columns extending along the data line to receive data voltages from the data line. Accordingly, the number of data lines 171a and 171b may be decreased in half relative to the number of pixel columns. Accordingly, the cost of the liquid crystal display may be reduced.

The first data line 171a includes a first source electrode 173a extending toward the first gate electrode 124a, and the second data line 171b includes a second source electrode 173b extending toward the second gate electrode 124b.

The first drain electrode 175a includes an end portion facing the first source electrode 173a and the other end portion having a wide area based on the first gate electrode 124a.

The second drain electrode 175b includes an end portion facing the second source electrode 173b and the other end portion having a comparatively wide area relative to the width of the second gate electrode 124b.

The common voltage line 131 is disposed between the two data lines 171a and 171b to extend to be parallel with the data lines 171a and 171b. The common voltage line 131 includes a plurality of extensions 135 for contacting adjacent portions of the common electrode 270.

The extensions 135 of the common voltage line 131 are disposed between the vertically extending portions 122a and 122b of the first gate line 121a and the second gate line 121b.

As described above, since the extensions 135 of the common voltage line 131 are disposed between the vertical portions 122a and 122b of the first gate line 121a and the second gate line 121b, an area formed by the gate lines 121a and 121b and the extensions 135 of the common voltage line 131 may be reduced.

Respective pixel electrodes 191 are formed over corresponding parts of the first drain electrode 175a and the second drain electrode 175b. The pixel electrodes 191 may have a planar form which packs most of one pixel area. The overall shape of the pixel electrode 191 may be mostly a polygon shape (e.g., a many-toothed comb filling the polygon shape) and having substantially parallel sides to the gate lines 121a and 121b, the data line 171a or 171b, and the common voltage line 131. The pixel electrode 191 may be made of a transparent conductive material such as ITO or IZO.

As described above, since parts of the respective pixel electrodes 191 are formed directly and respectively on the first drain electrode 175a and the second drain electrode 175b, a contact hole for connecting the pixel electrode 191 with the drain electrodes 175a and 175b need not be formed, and an aperture ratio of the liquid crystal display may thus be increased.

A first passivation layer 180 is disposed on the data conductor 171a, 171b, 175a, 175b and 131, the exposed semiconductors 154a and 154b, and the pixel electrode 191.

A third contact hole 184 is provided for exposing the branched extension 135 of the common voltage line 13. The third contact hole 184 is formed through the first passivation layer 180.

In the liquid crystal display according to the exemplary embodiment, the third contact hole 184 exposing the common voltage line 131 is not overlapped with the gate lines 121a and 121b. The extension 135 of the common voltage line 131 where the third contact hole 184 is disposed may also not be overlapped with the gate lines 121a and 121b.

As described above, the third contact hole 184 exposing the common voltage line 131 is formed to be separated from the gate lines 121a and 121b and thus it is possible to prevent the gate lines 121a and 121b and the common voltage line 131 from being shorted to one another when static electricity which inadvertently may be generated during a process of forming the third contact hole 184 penetrates through the gate insulating layer 140.

Further, the extension 135 of the common voltage line 131 is formed not to be overlapped with the gate lines 121a and 121b and thus a nonplanar step may not be formed at the extension 135 of the common voltage line 131, such that the third contact hole 184 may be symmetrically formed without a height difference according to a position. Accordingly, it is possible to increase reliability of a physical and electrical connection between the common voltage line 131 and the common electrode 270 through the third contact hole 184.

The common electrode 270 is formed on the first passivation layer 180. The common electrode 270 includes a plurality of branch electrodes 271 and is connected with the common electrode 270 disposed at the adjacent pixel.

The common electrode 270 is physically and electrically connected with the common voltage line 131 through the third contact holes 184 formed through the first passivation layer 180 and receives the common voltage therefrom.

The pixel electrode 191 receiving the respective data voltages generate corresponding electric fields through the liquid crystal layer 3 together with the neighboring portions of the common electrode 270 receiving the common voltage.

The plurality of integral branch electrodes 271 of the common electrode 270 is overlapped (interdigitated) with the pixel electrodes 191 having the planar form.

Next, the upper panel 200 will be described. A light blocking member 220 is formed on an insulation substrate 210. Further, a plurality of color filters 230 is formed on the substrate 210. Most of the color filters 230 may exist in a region surrounded by the light blocking member 220.

An overcoat 250 is formed on the color filter 230 and the light blocking member 220. The overcoat 250 may be made of an (organic) insulator and prevents the color filter 230 from being exposed and provides a flat surface. The overcoat 250 may be omitted.

The liquid crystal layer 3 interposed between the lower panel 100 and the upper panel 200 includes liquid crystal molecules (not shown), and the liquid crystal molecules may be aligned so that a long axis of thereof is horizontal to the surfaces of the two display panels 100 and 200 in a state where the electric field is not applied.

As described above, the liquid crystal display according to the exemplary embodiment is similar to the liquid crystal display according to the exemplary embodiment described with reference to FIGS. 2 and 3. However, the liquid crystal display according to the present exemplary embodiment includes the pixel electrode having a part formed directly on the drain electrode. Since the pixel electrode is so formed directly on the drain electrode and thus a contact hole for connecting the pixel electrode with the drain electrode is not needed or formed, an aperture ratio of the liquid crystal display may be increased.

Many features of the liquid crystal display according to the exemplary embodiment described with reference to FIGS. 2 and 3 may be applied to the liquid crystal display according to the exemplary embodiment.

Next, relative positions of the gate lines 121a and 121b, the common voltage line 131, and the contact hole 184 according to the exemplary embodiment will be described with reference to FIG. 9.

Referring to FIG. 9, relative positions of the gate lines, the common voltage line, and the contact hole of the liquid crystal display according to the exemplary embodiment are similar to those in the liquid crystal display according to the exemplary embodiment described with reference to FIG. 4.

Referring to FIG. 9, the common voltage line 131 has the extension 135 disposed between the vertically extending portions 122a and 122b of the first gate line 121a and the second gate line 121b which are adjacent to each other. The third contact hole 184 is formed over the extension 135, and the common voltage line 131 and the common electrode 270 are physically and the electrically connected through the third contact hole 184.

As shown in the drawings, the extension 135 of the common voltage line 131 where the third contact hole 184 exposing the common voltage line 131 is disposed and the third contact hole 184 is not laterally overlapped with the gate lines 121a and 121b. As described above, the third contact hole 184 exposing the common voltage line 131 is formed to be separated from the gate lines 121a and 121b and thus it is possible to prevent the gate lines 121a and 121b and the common voltage line 131 from being shorted together as static electricity which may be generated during the process of forming the third contact hole 184 penetrates into the gate insulating layer 140.

Further, the extension 135 of the common voltage line 131 is formed not to be overlapped with the gate lines 121a and 121b and thus a step may not be formed at the extension 135 of the common voltage line 131, such that the third contact hole 184 may be symmetrically formed without a height difference according to a position. Accordingly, it is possible to increase reliability of a physical and electrical connection between the common voltage line 131 and the common electrode 270 through the third contact hole 184.

As shown in FIG. 9, the first gate line 121a and the second gate line 121b have the first vertical portion 122a and the second vertical portion 122b, and the extension 135 of the common voltage line 131 is disposed between the vertical portions 122a and 122b of the first gate line 121a and the second gate line 121b which are disposed to be adjacent to each other.

The vertical direction height CC11 of the third contact hole 184 is partially overlapped by a seventh contact portion C11 where the first drain electrode 175a makes contact with the pixel electrode 191. Portion C11 is disposed between the first vertical portion 122a of the first gate line 121a and the first gate electrode 124a. An eighth contact portion C22 of the second drain electrode 175b and the pixel electrode is disposed between the second vertical portion 122b of the second gate line 121b and the second gate electrode 124b. Further, as described above, a ninth contact portion CC11 of the common voltage line 131 and the common electrode 270 is disposed between the first vertical portion 122a of the first gate line 121a and the second vertical portion 122b of the second gate line 121b.

The ninth contact portion CC11 of the common voltage line 131 and the common electrode 270 includes a first overlapped portion O1 which is partially overlapped with the seventh contact portion C11 of the first drain electrode 175a and the pixel electrode 191 on a horizontal line and a second overlapped portion O2 which is partially overlapped with the eighth contact portion C22 of the second drain electrode 175b and the pixel electrode 191 on a horizontal line.

Further, the seventh contact portion C11 of the first drain electrode 175a and the pixel electrode 191 and the eighth contact portion C22 of the second drain electrode 175b and the pixel electrode are disposed at a position where the contact holes are inversely (mirror image wise) symmetrical to each other relative to the ninth contact portion CC11 of the common voltage line 131 and the common electrode 270.

As described above, the ninth contact portion CC11 of the common voltage line 131 and the common electrode 270 is disposed between the vertically extending portions 122a and 122b of the two gate lines 121a and 121b, and the seventh contact portion C11 and the eighth contact portion C22 of the two pixel electrodes 191 and the two drain electrodes 175a and 175b which are disposed at the left and the right with the common voltage line 131 therebetween, and the ninth contact portion CC11 of the common voltage line 131 and the common electrode 270 are formed to have overlapped regions on the horizontal line, such that it is possible to reduce a vertical width dimension of the region where the two gate lines 121a and 121b and the contact hole 184 for connecting the common voltage line 131 and the common electrode 270 are formed. Accordingly, although the two gate lines 121a and 121b and the ninth contact portion CC11 of the common voltage line 131 and the common electrode 270 are disposed so as not to be vertically overlapped with each other, it is possible to prevent an aperture ratio of the liquid crystal display from being deteriorated.

Figure 10:
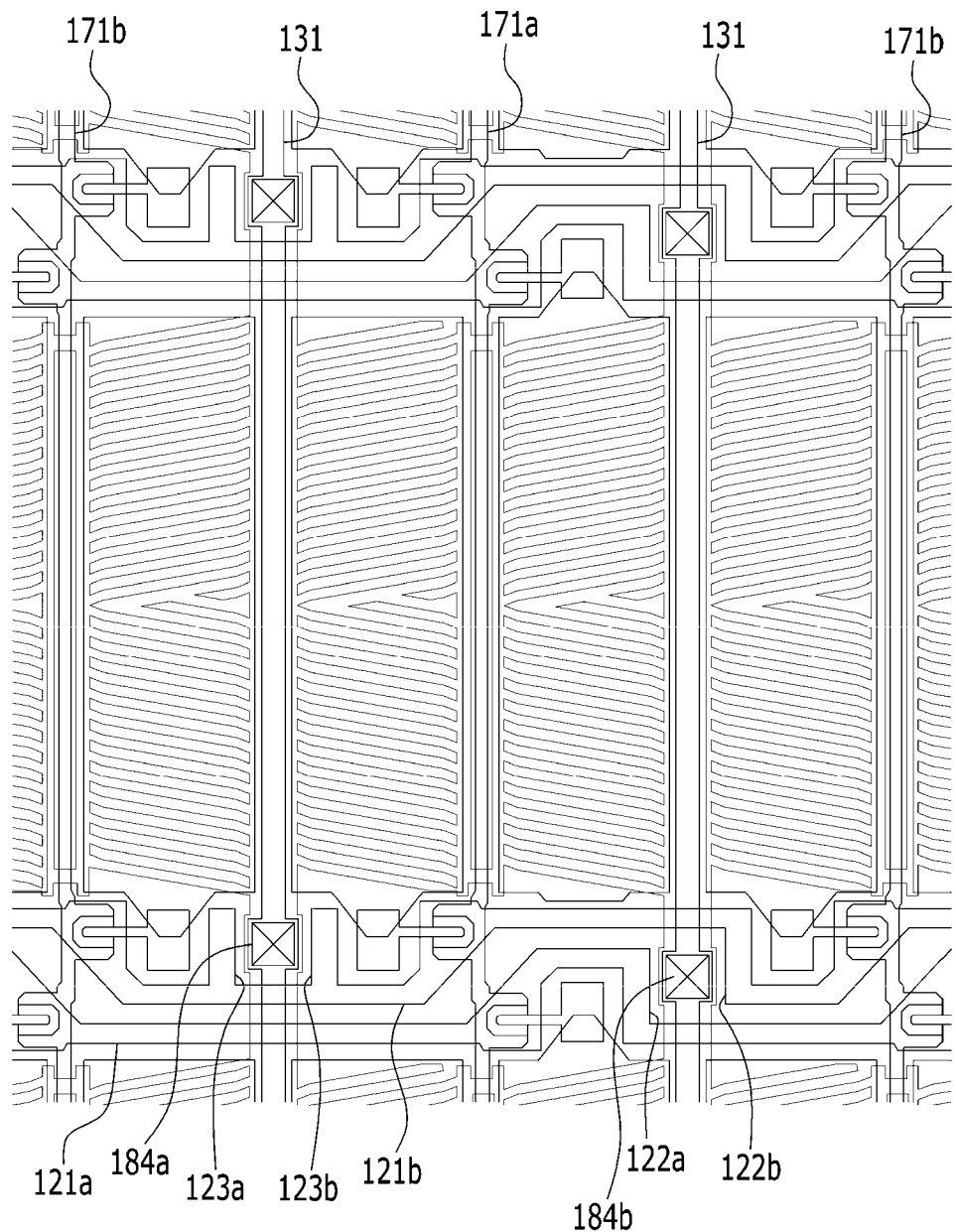
FIG. 10 is a layout view illustrating some pixels of the liquid crystal display according to still another exemplary embodiment.
Figure 11:
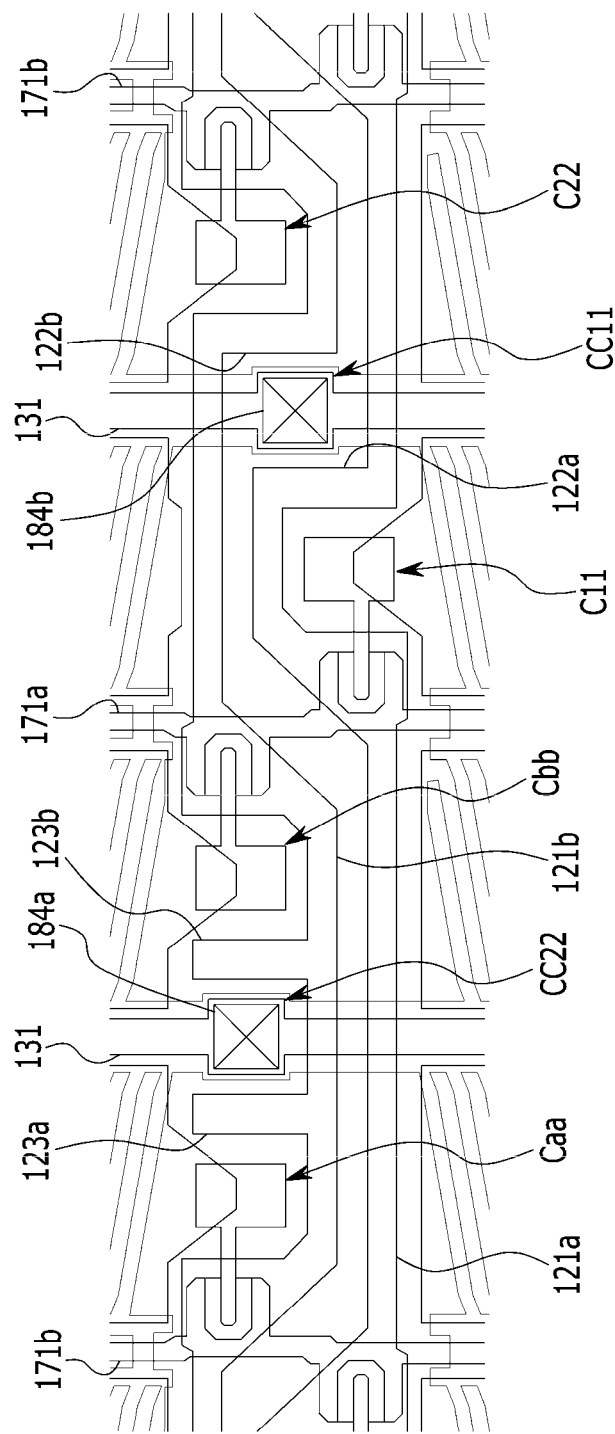
FIG. 11 is a diagram illustrating a part of a liquid crystal display according to another exemplary embodiment.

Next, a liquid crystal display according to another exemplary embodiment will be described with reference to FIGS. 10 and 11. FIG. 10 is a layout view illustrating some pixels of the liquid crystal display according to another exemplary embodiment. FIG. 11 is a diagram illustrating a part of a liquid crystal display according to the another exemplary embodiment.

Referring to FIG. 10, the liquid crystal display according to the exemplary embodiment is almost similar to the liquid crystal display described with reference to FIGS. 7 to 9. In particular, the layer forming structure of the respective constituent elements is the same as that in the exemplary embodiment described with reference to FIGS. 7 to 9. Accordingly, the detailed description for like constituent elements is omitted.

Referring to FIG. 10, the liquid crystal display according to the exemplary embodiment includes two data lines 171a and 171b which are alternately disposed along two pixel electrode 191 columns. Unlike the liquid crystal display according to the exemplary embodiment described with reference to FIGS. 7 to 9, a second data line 171b which is disposed at the left of a first data line 171a is further disposed.

Two pixel electrodes 191 disposed between the second data line 171b and the first data line 171a which are disposed at the left based on the first data line 171a are connected to two data lines 171a and 171b through a thin film transistor disposed below the pixel electrode 191, respectively. Meanwhile, two pixel electrodes 191 disposed between the second data line 171b and the first data line 171a which are disposed at the right based on the first data line 171a are connected respectively to two data lines 171a and 171b through thin film transistors disposed above and below relative to a horizontal line of symmetry.

Layouts of the two pixel electrodes 191 disposed between the second data line 171b and the first data line 171a which are disposed at the right based on the first data line 171a and the signal lines are the same as those in the exemplary embodiment described with reference to FIGS. 7 to 9.

Many features of the liquid crystal displays according to the exemplary embodiments described with reference to FIGS. 2 to 4, 5, 6, and 7 to 9 may be applied to the liquid crystal display according to the exemplary embodiment Next, layouts of the two pixel electrodes 191 disposed between the second data line 171b and the first data line 171a which are disposed at the left based on the first data line 171a and the signal lines will be described with reference to FIG. 11.

Referring to FIG. 11, the second gate line 121b of the two gate lines 121a and 121b, which are connected to the two pixel electrodes 191 disposed between the second data line 171b and the first data line 171a which are disposed at the left based on the first data line 171a, includes two third vertical portions 123a and 123b.

The extension 135 of the common voltage line 131 and a fourth contact hole 184a exposing the extension 135 of the common voltage line 131 are disposed between the two third vertical portions 123a and 123b. The extension 135 of the common voltage line 131 and the fourth contact hole 184a exposing the extension 135 of the common voltage line 131 are disposed between two third vertical portions 123a and 123b, and are not overlapped with the two gate lines 121a and 121b.

Further, two second gate electrodes 124b (see FIG. 12) of the second gate line 121b are disposed to have mirror symmetry with the common voltage line 131 therebetween, and a tenth contact portion Caa and an eleventh contact portion Cbb between the pixel electrode 191 and the drain electrodes 175a and 175b are disposed to have mirror symmetry between the third vertical portions 123a and 123b of the second gate line 121b and the second gate electrode 124b Further, a twelfth contact portion CC22 between the common voltage line 131 and the common electrode 270 is disposed substantially on a straight line with the tenth contact portion Caa and the eleventh contact portion Cbb between the pixel electrode 191 and the drain electrodes 175a and 175b.

As described above, in the case of the liquid crystal display according to the exemplary embodiment, the gate line 121b connected via TFT's to the two pixel electrodes 191 which are disposed with the common voltage line 131 therebetween has the two vertical portions 123a and 123b, and the twelfth contact portion CC22 connecting the common voltage line 131 and the common electrode 270 is disposed between the two vertical portions 123a and 123b. Further, the tenth contact portion Caa and the eleventh contact portion Cbb where the two pixel electrodes 191 and the two drain electrodes 175a and 175b disposed with the common voltage line 131 therebetween are connected with each other are disposed at both sides with the twelfth contact portion CC22 connecting the common voltage line 131 and the common electrode 270 therebetween to be disposed to have mirror symmetry relative to the common voltage line 131. Further, the twelfth contact portion CC22 between the common voltage line 131 and the common electrode 270 is disposed substantially on a straight line with the tenth contact portion Caa and the eleventh contact portion Cbb between the pixel electrode 191 and the drain electrodes 175a and 175b. Accordingly, a vertical width in which the two gate lines 121a and 121b and the contact hole 184a for connecting the common voltage line 131 and the common electrode 270 are formed may be reduced.

Figure 12:
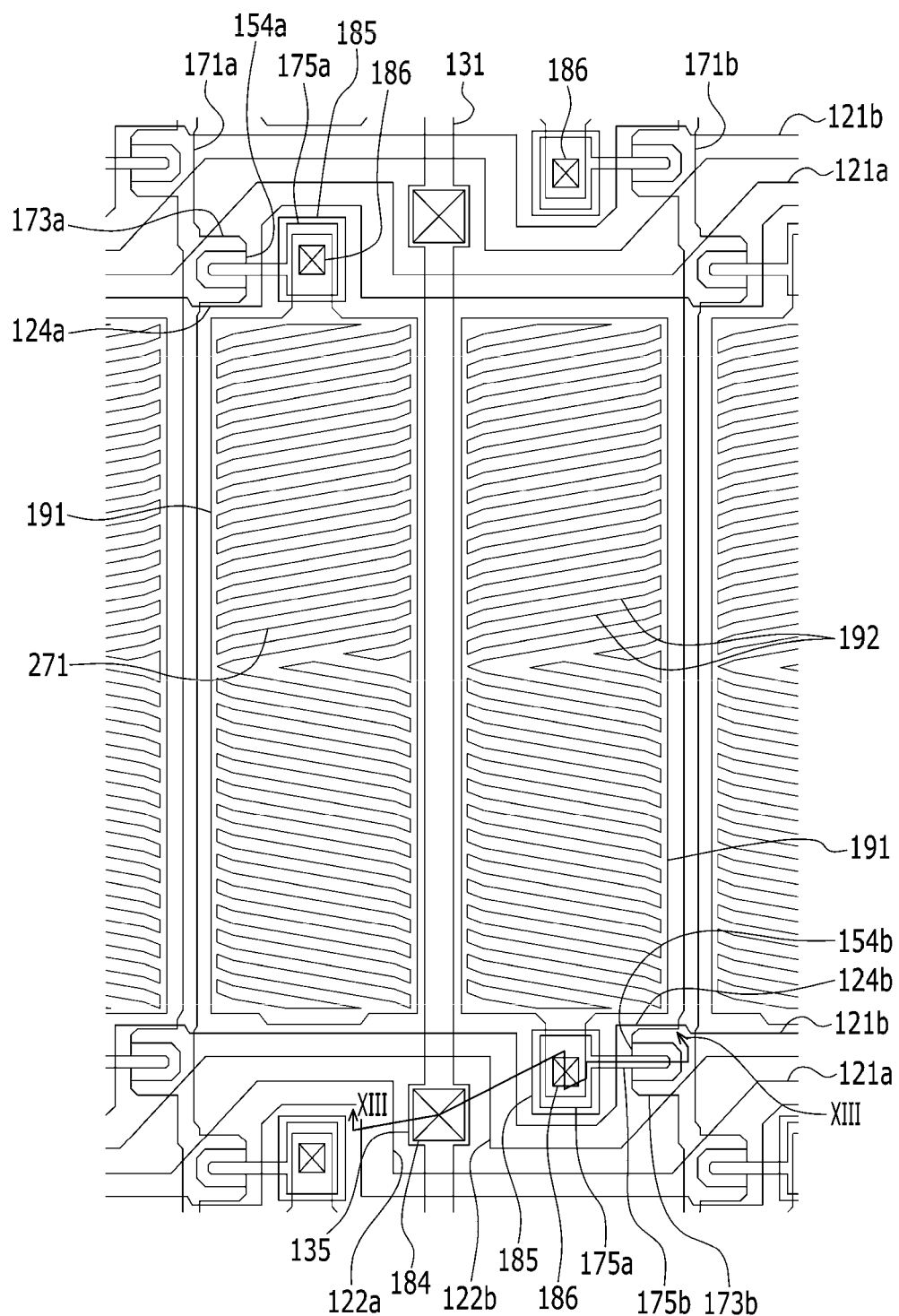
FIG. 12 is a layout view illustrating some pixels of the liquid crystal display according to a further exemplary embodiment.

Next, a liquid crystal display according to another exemplary embodiment will be described with reference to FIGS. 12 to 14. FIG. 12 is a layout view illustrating some pixels of the liquid crystal display according to another exemplary embodiment, FIG. 13 is a cross-sectional view illustrating the liquid crystal display of FIG. 12 taken along line XIII-XIII, and FIG. 14 is a diagram illustrating a part of a liquid crystal display according to this another exemplary embodiment.

Figure 13:
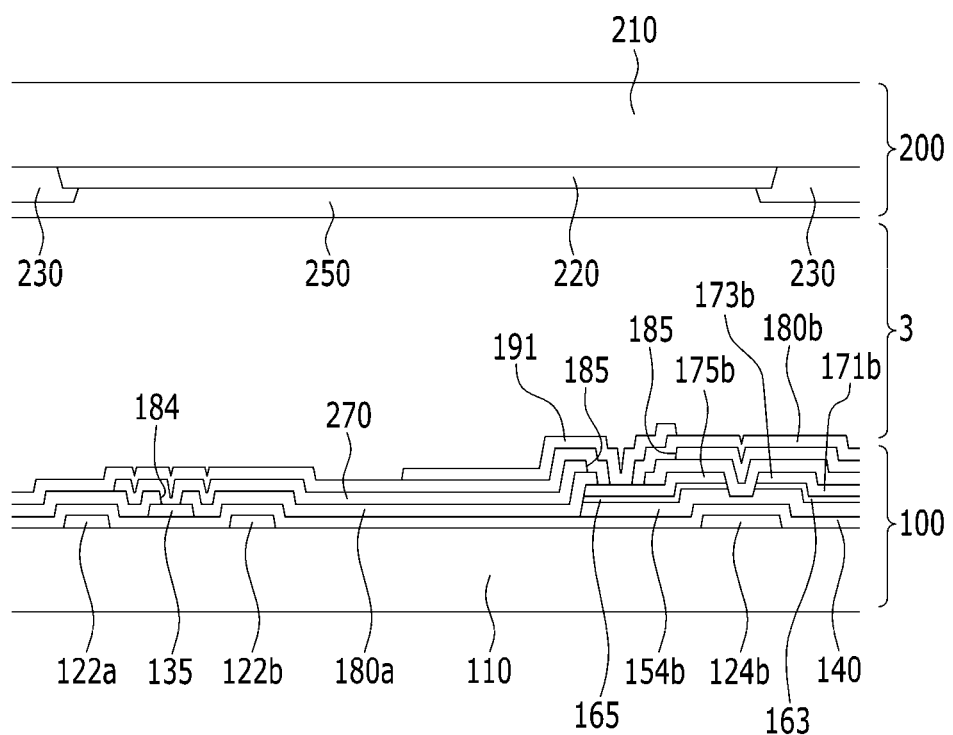
FIG. 13 is a cross-sectional view illustrating the liquid crystal display of FIG. 12 taken along line XIII-XIII.
Figure 14:
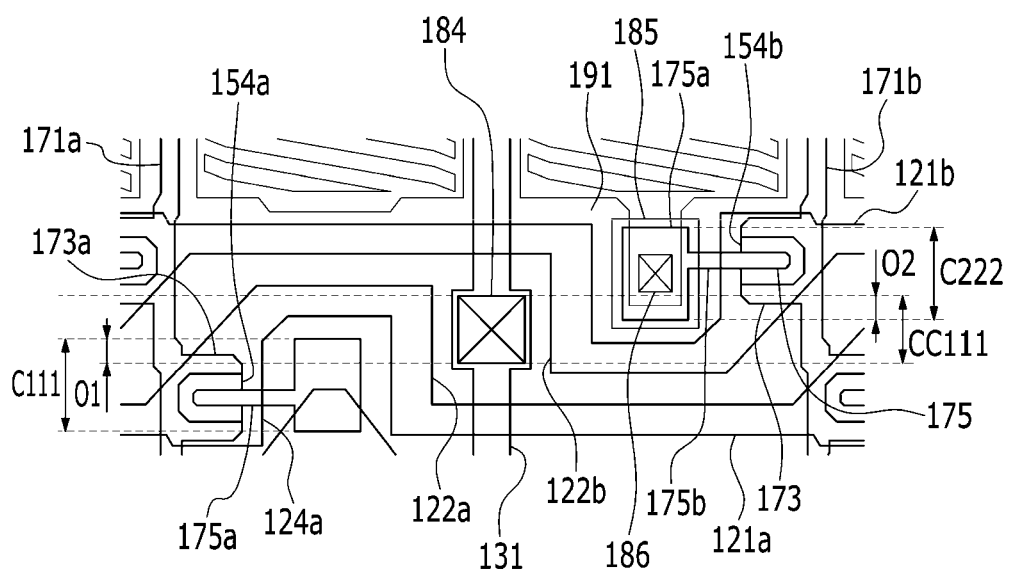
FIG. 14 is a diagram illustrating a part of a liquid crystal display according to still another exemplary embodiment.

Referring to FIGS. 12 and 13, a layout of signal lines of the liquid crystal display according to this exemplary embodiment is similar to that in the liquid crystal display according to the exemplary embodiment shown in FIGS. 2 and 3 or the liquid crystal display according to the exemplary embodiment shown in FIGS. 7 and 8.

The liquid crystal display according to this exemplary embodiment includes a lower panel 100 and an upper panel 200 facing each other, and a liquid crystal layer 3 injected between the two display panels 100 and 200.

The lower panel 100 will be described first.

A plurality of gate lines 121a and 121b is formed on an insulation substrate 110. The gate lines 121a and 121b are disposed for every one pixel row, and include a first gate line 121a disposed at the upper side along the pixel row and a second gate line 121b disposed at the lower side along the pixel row. The first gate line 121a is disposed to be adjacent to the second gate line 121b which is disposed in the adjacent front pixel row, and the second gate line 121b is disposed to be adjacent to the first gate line 121a which is disposed in the adjacent rear pixel row. Accordingly, the first gate line 121a and the second gate line 121b which are positioned in the current pixel row make a pair with the second gate line 121b and the first gate line 121a which are disposed in the adjacent pixel row to be disposed between the pixel rows.

The first gate line 121a includes a first gate electrode 124a, and the second gate line 121b includes a second gate electrode 124b. The first gate line 121a includes a first vertically extending portion 122a, and the second gate line 121b includes a second vertically extending portion 122b.

A gate insulating layer 140 is formed on the gate lines 121a and 121b.

A first semiconductor 154a and a second semiconductor 154b are formed on the gate insulating layer 140. A plurality of ohmic contacts 163 and 165 is disposed on the semiconductors 154a and 154b.

A data conductor including a plurality of data lines 171a and 171b, a plurality of drain electrodes 175a and 175b, and a plurality of common voltage lines 131 is formed on the ohmic contacts 163 and 165.

The data lines 171a and 171b respectively transfer respective data signals and mainly extend in a vertical direction to cross the gate lines 121a and 121b. The data lines 171a and 171b include a first data line 171a and a second data line 171b which are disposed with two pixel electrodes 191 therebetween.

Each of the data lines 171a and 171b is disposed one by one for every two pixel columns, and each of the data lines 171a and 171b is alternately connected with the pixel electrodes 191 of the pixels which are disposed at the lefts and rights of the data lines 171a and 171b along the pixel column. As described above, each of the data lines 171a and 171b is connected to the two pixel electrodes 191 which are disposed in two pixel columns along the pixel column to apply data voltage, such that the number of data lines 171a and 171b may be decreased in half relative to the number of pixel columns. Accordingly, the cost of the liquid crystal display may be reduced.

The first data line 171a includes a first source electrode 173a extending toward the first gate electrode 124a, and the second data line 171b includes a second source electrode 173b extending toward the second gate electrode 124b.

The first drain electrode 175a includes an end portion facing the first source electrode 173a and the other end portion having a wide area based on the first gate electrode 124a.

The second drain electrode 175b includes an end portion facing the second source electrode 173b and the other end portion having a wide area based on the second gate electrode 124b.

The common voltage line 131 is disposed between the two data lines 171a and 171b to extend to be parallel with the data lines 171a and 171b. The common voltage line 131 includes a plurality of extensions 135 for contacting the common electrode 270.

The extensions 135 of the common voltage line 131 are disposed between the vertical portions 122a and 122b of the first gate line 121a and the second gate line 121b.

As described above, since the extensions 135 of the common voltage line 131 are disposed between the vertical portions 122a and 122b of the first gate line 121a and the second gate line 121b, an area formed by the gate lines 121a and 121b and the extensions 135 of the common voltage line 131 may be reduced.

A lower passivation layer 180a is disposed on the data conductors 171a, 171b, 175a, 175b and 131 and the exposed semiconductors 154a and 154b. A common electrode 270 is formed on the lower passivation layer 180a. The common electrode 270 may have a planar form, and the common electrodes 270 disposed in the adjacent pixel areas may be connected with each other. The common electrode may have an opening-including region 185 formed above the drain electrodes 175a and 175b. Further, although not shown, the common electrode 270 has an opening region (not shown) exposing a corresponding region between the source electrodes 173a and 173b and the drain electrodes 175a and 175b described above and thus may not be disposed at a channel part of the respective thin film transistor.

An upper passivation layer 180b is disposed on the common electrode 270.

A pixel electrode 191 is formed on the upper passivation layer 180b. The pixel electrode 191 includes a plurality of branch electrodes 192.

A third contact hole 184 exposing the extension 135 of the common voltage line 131 is formed on the lower passivation layer 180a.

The common electrode 270 is connected with the extension 135 of the common voltage line 131 through the third contact hole 184.

A fifth contact hole 186 is formed in the lower passivation layer 180a and the upper passivation layer 180b.

The fifth contact hole 186 is formed in the opening-including region 185 of the common electrode 270.

The pixel electrode 191 contacts the drain electrodes 175a and 175b through the fifth contact hole 186 formed in the lower passivation layer 180a and the upper passivation layer 180b.

Each pixel electrode 191 receiving a corresponding data voltage generates a respective electric field through its corresponding portion of the liquid crystal layer 3 together with the common electrode 270 receiving the common voltage.

In the liquid crystal display according to the exemplary embodiment, the third contact hole 184 exposing the common voltage line 131 is not overlapped with the gate lines 121a and 121b. The extension 135 of the common voltage line 131 where the third contact hole 184 is disposed may not be overlapped with the gate lines 121a and 121b.

As described above, the third contact hole 184 exposing the common voltage line 131 is formed to be separated from the gate lines 121a and 121b and thus it is possible to prevent the gate lines 121a and 121b and the common voltage line 131 from being shorted together as static electricity which may be generated during the process of forming the third contact hole 184 penetrates into the gate insulating layer 140.

Further, the extension 135 of the common voltage line 131 is formed not to be overlapped with the gate lines 121a and 121b and thus a nonplanar step may not be formed at the extension 135 of the common voltage line 131, such that the third contact hole 184 may be symmetrically formed without a height difference according to a position. Accordingly, it is possible to increase reliability of a physical and electrical connection between the common voltage line 131 and the common electrode 270 through the third contact hole 184.

Next, the upper panel 200 will be described. A light blocking member 220 is formed on an insulation substrate 210. A plurality of different color filters 230 is formed on the substrate 210. Most of the color filters 230 may exist in a region surrounded by the light blocking member 220.

A planarizing overcoat 250 is formed on the color filter 230 and the light blocking member 220. The overcoat 250 may be omitted.

The liquid crystal layer 3 interposed between the lower panel 100 and the upper panel 200 includes liquid crystal molecules (not shown), and the liquid crystal molecules may be aligned so that a long axis of thereof is horizontal to the surfaces of the two display panels 100 and 200 in a state where the electric field is not applied.

As described above, the liquid crystal display according to this exemplary embodiment is similar to the liquid crystal display according to the exemplary embodiment described with reference to FIGS. 2 and 3 or the liquid crystal display according to the exemplary embodiment described with reference to FIGS. 7 and 8. However, the liquid crystal display according to this exemplary embodiment includes a lower passivation layer disposed on the data conductors, a common electrode having a planar form disposed on the lower passivation layer, an upper passivation layer disposed on the common electrode, and a pixel electrode disposed on the upper passivation layer and including a plurality of branch electrodes.

Many features of the liquid crystal displays according to the exemplary embodiments described with reference to FIGS. 2 and 3 or the liquid crystal display according to the exemplary embodiment described with reference to FIGS. 7 and 8 may be applied to the liquid crystal display according to the exemplary embodiment.

Next, detailed portions of the gate lines 121a and 121b, the common voltage line 131, and the contact hole 184 according to the exemplary embodiment will be described with reference to FIG. 14.

Referring to FIG. 14, the relative positions of the gate lines, the common voltage line, and the contact hole of the liquid crystal display according to the illustrated exemplary embodiment are similar to those in the liquid crystal display according to the exemplary embodiment described with reference to FIG. 4 and the liquid crystal display according to the exemplary embodiment described with reference to FIG. 9.

Referring to FIG. 14, the common voltage line 131 has an extension 135 disposed between the vertically extending portions 122a and 122b of the first gate line 121a and the second gate line 121b which are disposed to be adjacent to each other. The third contact hole 184 is formed on the extension 135, and the common voltage line 131 and the common electrode 270 are physically and electrically connected with each other through the third contact hole 184.

As shown in the drawing, the extension 135 of the common voltage line 131 where the third contact hole 184 exposing the common voltage line 131 is disposed and the third contact hole 184 are not overlapped with the gate lines 121a and 121b. As described above, the third contact hole 184 exposing the common voltage line 131 is formed to be separated from the gate lines 121a and 121b and thus it is possible to prevent the gate lines 121a and 121b and the common voltage line 131 from being shorted together as static electricity which may be generated during the process of forming the third contact hole 184 penetrates into the gate insulating layer 140.

Further, the extension 135 of the common voltage line 131 is formed not to be overlapped with the gate lines 121a and 121b and thus a nonplanar step may not be formed at the extension 135 of the common voltage line 131, such that the third contact hole 184 may be symmetrically formed without a height difference according to a position. Accordingly, it is possible to increase reliability of a physical and electrical connection between the common voltage line 131 and the common electrode 270 through the third contact hole 184.

As shown in FIG. 14, the first gate line 121a and the second gate line 121b have the first vertically extending portion 122a and the second vertically extending portion 122b, and the extension 135 of the common voltage line 131 is disposed between the vertical portions 122a and 122b of the first gate line 121a and the second gate line 121b which are disposed to be adjacent to each other.

A thirteenth contact portion C111 of the first drain electrode 175a and the pixel electrode 191 is disposed between the first vertical portion 122a of the first gate line 121a and the first gate electrode 124a, and a fourteenth contact portion C222 of the second drain electrode 175b and the pixel electrode is disposed between the second vertical portion 122b of the second gate line 121b and the second gate electrode 124b. Further, as described above, a fifteenth contact portion CC111 of the common voltage line 131 and the common electrode 270 is disposed between the first vertical portion 122a of the first gate line 121a and the second vertical portion 122b of the second gate line 121b.

The fifteenth contact portion CC111 of the common voltage line 131 and the common electrode 270 includes a first overlapped portion O1 which is partially overlapped with the thirteenth contact portion C111 of the first drain electrode 175a and the pixel electrode 191 on a horizontal line and a second overlapped portion O2 which is partially overlapped with the fourteenth contact portion C222 of the second drain electrode 175b and the pixel electrode on a horizontal line.

Further, the thirteenth contact portion C111 of the first drain electrode 175a and the pixel electrode 191 and the fourteenth contact portion C222 of the second drain electrode 175b and the pixel electrode are disposed at a position where the contact holes are inversely symmetrical to each other based on the fifteenth contact portion CC111 of the common voltage line 131 and the common electrode 270.

As described above, the fifteenth contact portion CC111 of the common voltage line 131 and the common electrode 270 is disposed between the vertical portions 122a and 122b of the two gate lines 121a and 121b, and the thirteenth contact portion C111 and the fourteenth contact portion C222 of the two pixel electrodes 191 and the two drain electrodes 175a and 175b which are disposed at the left and the right with the common voltage line 131 therebetween, and the fifteenth contact portion CC111 of the common voltage line 131 and the common electrode 270 are formed to have overlapped regions on the horizontal line, such that it is possible to reduce a vertical width of the region where the two gate lines 121a and 121b and the contact hole 184 for connecting the common voltage line 131 and the common electrode 270 are formed. Accordingly, although the two gate lines 121a and 121b and the fifteenth contact portion CC111 of the common voltage line 131 and the common electrode 270 are disposed so as not to be vertically overlapped with each other, it is possible to prevent an aperture ratio of the liquid crystal display from being deteriorated.

Figure 15:
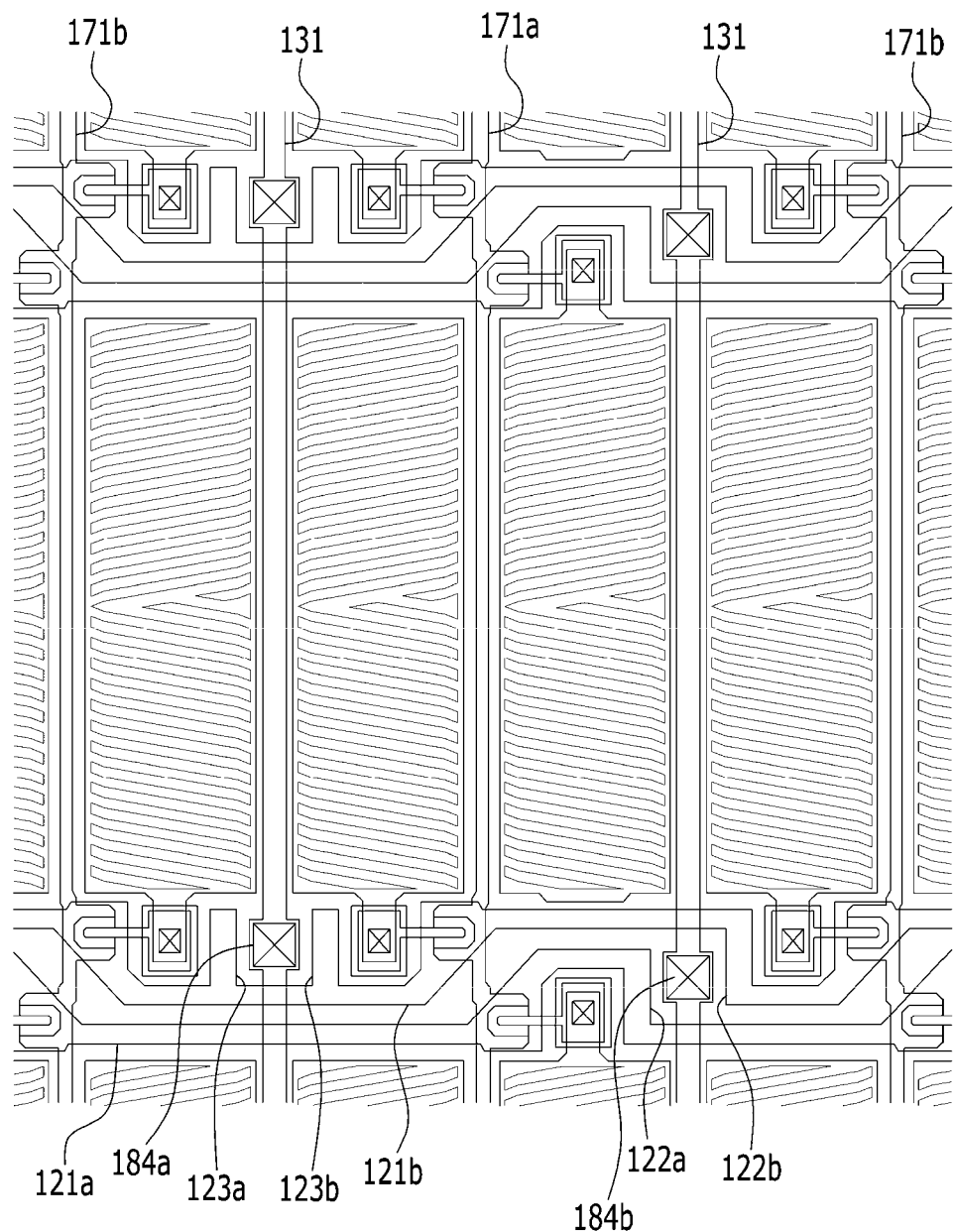
FIG. 15 is a layout view illustrating some pixels of the liquid crystal display according to another exemplary embodiment.
Figure 16:
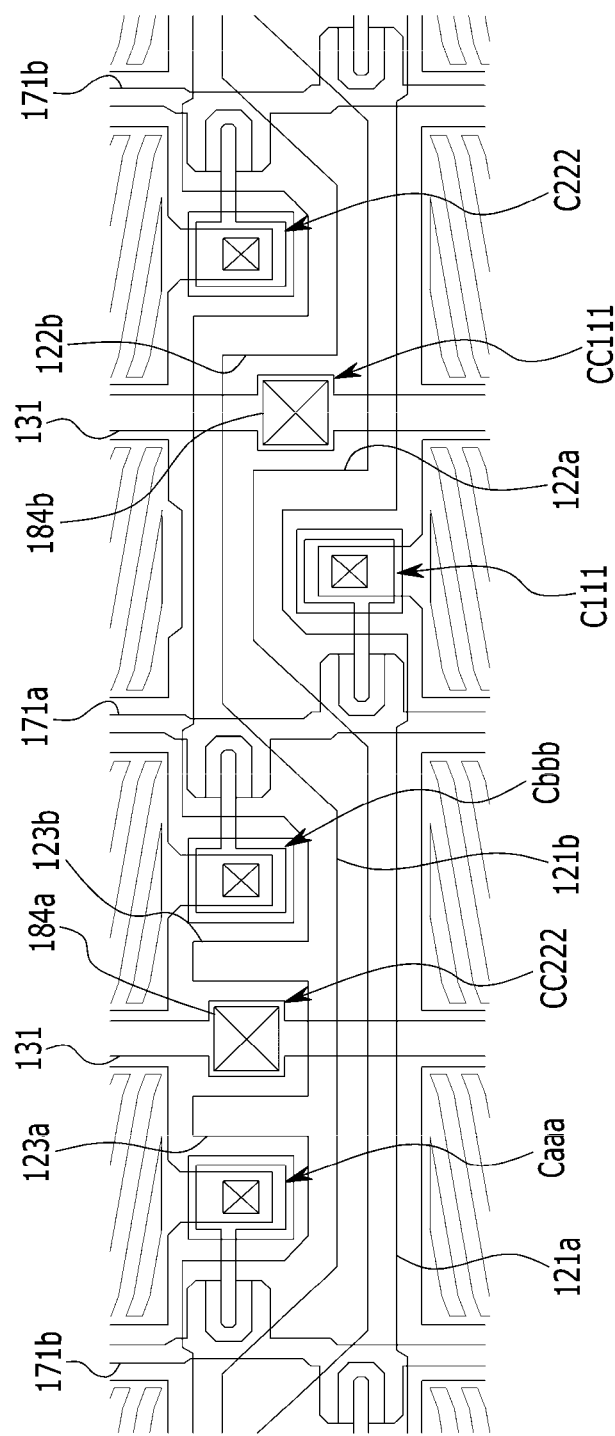
FIG. 16 is a diagram illustrating a part of a liquid crystal display according to yet another exemplary embodiment.

Next, a liquid crystal display according to another exemplary embodiment will be described with reference to FIGS. 15 and 16. FIG. 15 is a layout view illustrating some pixels of the liquid crystal display according to this another exemplary embodiment and FIG. 16 is a diagram illustrating a part of a liquid crystal display according to this another exemplary embodiment.

Referring to FIG. 15, the liquid crystal display according to the exemplary embodiment is almost similar to the liquid crystal display described with reference to FIGS. 12 to 14. In particular, the layer forming structure of the respective constituent elements is the same as that in the exemplary embodiment described with reference to FIGS. 12 to 14. Accordingly, the detailed description for like constituent elements is omitted.

Referring to FIG. 15, the liquid crystal display according to the exemplary embodiment includes two data lines 171a and 171b which are alternately disposed along two pixel electrode 191 columns. Unlike the liquid crystal display according to the exemplary embodiment described with reference to FIGS. 12 to 14, a second data line 171b which is disposed at the left of a first data line 171a is further disposed.

Two pixel electrodes 191 disposed between the second data line 171b and the first data line 171a which are disposed at the left based on the first data line 171a are connected to two data lines 171a and 171b through a thin film transistor disposed below the pixel electrode 191, respectively. On the contrary, two pixel electrodes 191 disposed between the second data line 171b and the first data line 171a which are disposed at the right based on the first data line 171a are connected to two data lines 171a and 171b through thin film transistors disposed above and below the pixel electrode 191, respectively.

Layouts of the two pixel electrodes 191 disposed between the second data line 171b and the first data line 171a which are disposed at the right based on the first data line 171a and the signal lines are the same as those in the exemplary embodiment described with reference to FIGS. 7 to 9.

Many features of the liquid crystal displays according to the exemplary embodiments described with reference to FIGS. 2 to 4, 5 and 6, 7 to 9, 10 and 11, and 12 to 14 may all be applied to the liquid crystal display according to the exemplary embodiment.

Layouts of the two pixel electrodes 191 disposed between the second data line 171b and the first data line 171a which are disposed at the left based on the first data line 171a and the signal lines will be described with reference to FIG. 16.

Referring to FIG. 16, the second gate line 121b of the two gate lines 121a and 121b, which are connected to the two pixel electrodes 191 disposed between the second data line 171b and the first data line 171a which are disposed at the left based on the first data line 171a, includes two third vertical portions 123a and 123b.

The extension 135 of the common voltage line 131 and a fourth contact hole 184a exposing the extension 135 of the common voltage line 131 are disposed between the two third vertical portions 123a and 123b. The extension 135 of the common voltage line 131 and the fourth contact hole 184a exposing the extension 135 of the common voltage line 131 are disposed between two third vertical portions 123a and 123b, and are not overlapped with the two gate lines 121a and 121b.

Further, two second gate electrodes 124b of the second gate line 121b are disposed to have mirror symmetry with the common voltage line 131 therebetween, and a sixteenth contact portion Caaa and a seventeenth contact portion Cbbb between the pixel electrode 191 and the drain electrodes 175a and 175b are disposed to have mirror symmetry between the third vertical portions 123a and 123b of the second gate line 121b and the second gate electrode 124b Further, an eighteenth contact portion CC222 between the common voltage line 131 and the common electrode 270 is disposed substantially on a straight line with the sixteenth contact portion Caaa and the seventeenth contact portion Cbbb between the pixel electrode 191 and the drain electrodes 175a and 175b.

As described above, in the case of the liquid crystal display according to the exemplary embodiment, the gate line 121b connected to the two pixel electrodes 191 which are disposed with the common voltage line 131 therebetween has the two vertical portions 123a and 123b, and the eighteenth contact portion CC222 connecting the common voltage line 131 and the common electrode 270 is disposed between the two vertical portions 123a and 123b. Further, the sixteenth contact portion Caaa and the seventeenth contact portion Cbbb where the two pixel electrodes 191 and the two drain electrodes 175a and 175b disposed with the common voltage line 131 therebetween are connected with each other are disposed at both sides with the eighteenth contact portion CC222 connecting the common voltage line 131 and the common electrode 270 therebetween to be disposed to have mirror symmetry based on the common voltage line 131. Further, the eighteenth contact portion CC222 between the common voltage line 131 and the common electrode 270 is disposed substantially on a straight line with the sixteenth contact portion Caaa and the seventeenth contact portion Cbbb between the pixel electrode 191 and the drain electrodes 175a and 175b. Accordingly, a vertical width in which the two gate lines 121a and 121b and the contact hole 184a for connecting the common voltage line 131 and the common electrode 270 are formed may be reduced.

In the exemplary embodiment described above, the pixel electrode has a planar form, the common electrode has the plurality of branch electrodes or has a planar form, and the pixel electrode has the plurality of branch electrodes, but the present invention is not limited thereto and may be applied to all cases where any one of two field generating electrodes has a planar form and the other has a plurality of branch electrodes. Further, in the case of the liquid crystal display according to another exemplary embodiment of the present invention, an additional field generating electrode formed on the upper panel may also be included.

While the present disclosure of invention has been described in connection with what is presently considered to be practical exemplary embodiments, it is to be understood that the teachings are not limited to the disclosed embodiments, but, on the contrary, they are intended to cover various modifications and equivalent arrangements included within the spirit and scope of the disclosure.

What is claimed is:

1. A liquid crystal display, comprising:
   a plurality of pixel electrodes arranged in a matrix format having rows and columns;

a first gate line and an immediately adjacent second gate line disposed between two pixel electrode rows, the first and second gate lines generally extending in a first direction corresponding to a direction of the matrix rows;

a first data line disposed at left side of two pixel electrode columns and a second data line disposed at right side of the two pixel electrode columns, the first and second data lines extending in a second direction corresponding to a direction of the matrix columns;

a common voltage line disposed between the two pixel electrode columns, the common voltage line extending in the second direction; and a common electrode vertically overlapped with the plurality of pixel electrodes to form electric fields with the pixel electrodes, wherein the common voltage line and the common electrode are vertically overlapped with each other with an insulating layer disposed therebetween and the common voltage line and the common electrode are connected with each other through a common contact hole formed through the insulating layer, wherein the first gate line has a first vertical portion extending in the second direction, and the second gate line has a second vertical portion extending in the second direction, and wherein the common contact hole is laterally disposed between the first vertical portion and the second vertical portion.

2. The liquid crystal display of claim 1, wherein:
the common contact hole is not vertically overlapped with either of the first gate line and the second gate line.

3. The liquid crystal display of claim 2, wherein:
one of the two pixel electrodes disposed with the common voltage line therebetween is connected with a first drain electrode through a first drain contact hole,
the other one of the two pixel electrodes is connected with a second drain electrode through a second drain contact hole, and
the first drain contact hole and the second drain contact hole are disposed to be mirror image wise symmetrical to each other relative to the common contact hole placed therebetween.

4. The liquid crystal display of claim 3, wherein:
the common contact hole is at least partially overlapped in a vertical direction with the first drain contact hole and with the second drain contact hole based on a hypothetical line extending in the first direction through the common contact hole.

5. The liquid crystal display of claim 4, wherein:
the first drain electrode is disposed over a first gate electrode connected with the first gate line, and
the second drain electrode is disposed over a second gate electrode connected with the second gate line.

6. The liquid crystal display of claim 5, wherein:
the plurality of pixel electrodes is formed with a same layer as that of the first gate line and the second gate line.

7. The liquid crystal display of claim 6, wherein:
the common voltage line is formed with a same layer as that of the first data line and the second data line.

8. The liquid crystal display of claim 7, wherein:
the common electrode and the plurality of pixel electrodes are overlapped with each other, and at least one of the common electrode and the plurality of pixel electrodes includes a branch electrode.

9. The liquid crystal display of claim 1, wherein:
one of the two pixel electrodes disposed with the common voltage line therebetween is connected with a first drain electrode through a first drain contact hole,
the other one of the two pixel electrodes is connected with a second drain electrode through a second drain contact hole, and
the first drain contact hole and the second drain contact hole are inversely symmetrical to each other relative to the common contact hole.

10. The liquid crystal display of claim 9, wherein:
at least a part of the common contact hole is overlapped with the first drain contact hole and the second drain contact hole relative to a line extending in the first direction.

11. The liquid crystal display of claim 10, wherein:
the first drain electrode is disposed over a first gate electrode connected with the first gate line, and
the second drain electrode is disposed over a second gate electrode connected with the second gate line.

12. The liquid crystal display of claim 11, wherein:
the plurality of pixel electrodes is formed with a same layer as that of the first gate line and the second gate line.

13. The liquid crystal display of claim 12, wherein:
the common voltage line is formed with a same layer as that of the first data line and the second data line.

14. The liquid crystal display of claim 13, wherein:
the common electrode and the plurality of pixel electrodes are overlapped with each other, and at least one of the common electrode and the plurality of pixel electrodes includes a branch electrode.

15. The liquid crystal display of claim 1, wherein:
the plurality of pixel electrodes is formed with a same layer as that of the first gate line and the second gate line.

16. The liquid crystal display of claim 15, wherein:
the common voltage line is formed with a same layer as that of the first data line and the second data line.

17. The liquid crystal display of claim 16, wherein:
the common electrode and the plurality of pixel electrodes are overlapped with each other, and at least one of the common electrode and the plurality of pixel electrodes includes a branch electrode.

18. The liquid crystal display of claim 1, wherein:
the common voltage line is formed with a same layer as that of the first data line and the second data line.

19. The liquid crystal display of claim 18, wherein:
the common electrode and the plurality of pixel electrodes are overlapped with each other, and at least one of the common electrode and the plurality of pixel electrodes includes a branch electrode.

20. The liquid crystal display of claim 1, wherein:
the common electrode and the plurality of pixel electrodes are overlapped with each other, and at least one of the common electrode and the plurality of pixel electrodes includes a branch electrode.

21. A liquid crystal display, comprising:
a plurality of pixel electrodes disposed in a matrix, the matrix having rows and columns;
a first gate line and an immediately adjacent second gate line disposed between two pixel electrode rows and generally extending in a first direction parallel that of the pixel rows;
a first data line disposed at left side of two pixel electrode columns and a second data line disposed at right side of the two pixel electrode columns and extending in a second direction parallel that of the pixel columns;

a common voltage line disposed between the two pixel electrode columns and extending in the second direction; and a common electrode vertically overlapped with the plurality of pixel electrodes to form electric fields therewith pixel electrodes, wherein the common voltage line and the common electrode are vertically overlapped with each other with an insulating layer therebetween and connected with each other through a common contact hole formed through the insulating layer, wherein at least one of the first gate line and the second gate line has a third vertical portion and a fourth vertical portion which extends in the second direction, and the common contact hole is laterally disposed between the third vertical portion and the fourth vertical portion.

22. The liquid crystal display of claim 21, wherein:
the common contact hole is not vertically overlapped with either of the first gate line and the second gate line.

23. The liquid crystal display of claim 22, wherein:
at least one of the two pixel electrodes disposed with the common voltage line therebetween is connected with a first drain electrode through a first drain contact hole,
the other one of the two pixel electrodes is connected with a second drain electrode through a second drain contact hole, and
the first drain contact hole and the second drain contact hole are mirror-symmetrically disposed relative to each other with the common contact hole in between.

24. The liquid crystal display of claim 23, wherein:
at least a part of the common contact hole is overlapped with the first drain contact hole and the second drain contact hole based on a line extending in the first direction.

25. The liquid crystal display of claim 24, wherein:
the first drain electrode and the second drain electrode are disposed on a gate electrode connected to at least one of the first gate line and the second gate line.

26. The liquid crystal display of claim 25, wherein:
the plurality of pixel electrodes is formed with a same layer as that of the first gate line and the second gate line.

27. The liquid crystal display of claim 26, wherein:
the common voltage line is formed with a same layer as that of the first data line and the second data line.

28. The liquid crystal display of claim 27, wherein:
the common electrode and the plurality of pixel electrodes are overlapped with each other, and at least one of the common electrode and the plurality of pixel electrodes includes a branch electrode.

29. The liquid crystal display of claim 21, wherein:
at least one of the two pixel electrodes disposed with the common voltage line therebetween is connected with a first drain electrode through a first drain contact hole,
the other one of the two pixel electrodes is connected with a second drain electrode through a second drain contact hole, and
the first drain contact hole and the second drain contact hole are mirror-symmetrical to each other relative to the common contact hole disposed therebetween.

30. The liquid crystal display of claim 29, wherein:
at least a part of the common contact hole is overlapped with the first drain contact hole and the second drain contact hole based on a line extending in the first direction.

31. The liquid crystal display of claim 30, wherein:
the first drain electrode and the second drain electrode are disposed on a gate electrode connected to at least one of the first gate line and the second gate line.

32. The liquid crystal display of claim 31, wherein:
the plurality of pixel electrodes is formed with a same layer as that of the first gate line and the second gate line.

33. The liquid crystal display of claim 32, wherein:
the common voltage line is formed with a same layer as that of the first data line and the second data line.

34. The liquid crystal display of claim 33, wherein:
the common electrode and the plurality of pixel electrodes are overlapped with each other, and at least one of the common electrode and the plurality of pixel electrodes includes a branch electrode.

35. The liquid crystal display of claim 21, wherein:
the plurality of pixel electrodes is formed with the same layer as the first gate line and the second gate line.

36. The liquid crystal display of claim 35, wherein:
the common voltage line is formed with a same layer as that of the first data line and the second data line.

37. The liquid crystal display of claim 36, wherein:
the common electrode and the plurality of pixel electrodes are overlapped with each other, and at least one of the common electrode and the plurality of pixel electrodes includes a branch electrode.

38. The liquid crystal display of claim 21, wherein:
the common voltage line is formed with a same layer as that of the first data line and the second data line.

39. The liquid crystal display of claim 38, wherein:
the common electrode and the plurality of pixel electrodes are overlapped with each other, and at least one of the common electrode and the plurality of pixel electrodes includes a branch electrode.

40. The liquid crystal display of claim 21, wherein:
the common electrode and the plurality of pixel electrodes are overlapped with each other, and at least one of the common electrode and the plurality of pixel electrodes includes a branch electrode integrally extending therefrom.

* * * * *